United States Patent
Kung et al.

(10) Patent No.: US 7,296,025 B2
(45) Date of Patent: Nov. 13, 2007

(54) SYSTEM AND METHOD FOR MANAGING CREATIVE ASSETS VIA A RICH USER CLIENT INTERFACE

(75) Inventors: Allen Kung, New York, NY (US); Tony King, Brooklyn, NY (US); Albert Kang, New York, NY (US); Russell Gardner, Hudson, NY (US)

(73) Assignee: CreateThe, LLC, New York, NY (US)

( * ) Notice: Subject to any disclaimer, the term of this patent is extended or adjusted under 35 U.S.C. 154(b) by 0 days.

(21) Appl. No.: 11/255,192

(22) Filed: Oct. 21, 2005

(65) Prior Publication Data

US 2006/0184540 A1    Aug. 17, 2006

Related U.S. Application Data

(60) Provisional application No. 60/620,442, filed on Oct. 21, 2004.

(51) Int. Cl.
*G06F 7/00* (2006.01)
*G06F 15/00* (2006.01)

(52) U.S. Cl. ............... 707/10; 707/100; 707/101; 707/102; 707/104.1; 707/500.01; 707/511; 707/513

(58) Field of Classification Search ........... 707/10, 707/100–104.1; 715/500.01, 513
See application file for complete search history.

(56) References Cited

U.S. PATENT DOCUMENTS 5,706,502 A * 1/1998 Foley et al. ............... 707/10
6,330,572 B1 * 12/2001 Sitka ........................ 707/205
7,000,180 B2   2/2006 Balthaser
2001/9339572        12/2001 Sitka
2002/0030689 A1 *  3/2002 Eichel et al. .............. 345/588
2003/0050929 A1 *  3/2003 Bookman et al. .......... 707/7
2003/0066029 A1    4/2003 Vizina
2004/0172383 A1    9/2004 Yoshida et al.
2004/0172416 A1    9/2004 Murakami et al.
2004/0177319 A1 *  9/2004 Horn ........................ 715/501.1
2004/0230572 A1 * 11/2004 Omoigui ................... 707/3
2005/0102324 A1 *  5/2005 Spring et al. .............. 707/104.1
2005/0114784 A1 *  5/2005 Spring et al. .............. 715/762
2005/0240909 A1 * 10/2005 Tersigni .................... 717/140
2005/0289482 A1 * 12/2005 Anthony et al. ........... 715/851
2006/0015594 A1 *  1/2006 Kontamsetty et al. ...... 709/221
2006/0136456 A1 *  6/2006 Jacobs et al. .............. 707/101
2006/0200466 A1 *  9/2006 Kaasten et al. ............ 707/7

(Continued)

OTHER PUBLICATIONS

Fong, et al. "The Rich Client", Viewpoint, vol. 3, No. 7, 2003.

(Continued)

*Primary Examiner*—Shahid Alam
*Assistant Examiner*—Anh Ly
(74) *Attorney, Agent, or Firm*—Edell, Shapiro & Finnan, LLC

(57) ABSTRACT

A method and system according to the present invention provide integrated virtual asset management and publishing capabilities via a Rich user client interface. The client user, via a Rich user client interface, communicates with a central application server to store and manage creative assets or works, and to publish those works to other end users. The user interaction is conducted within a single instance of a Web browser session.

28 Claims, 34 Drawing Sheets

OTHER PUBLICATIONS

Transmedia Introduces Glide Effortless, NAB2005, Apr. 18, 2005.

TransMedia Releases Colaborata 2.2: Powerful Media Management in One Complete Online Platform; New Automated Video and Audio Publishing, Apr. 19, 2004.

TransMedia To Unveil Glide Effortless: Next Generation Interactive Portable Desktop, Oct. 12, 2005.

Ezer, "Trends in Rich User Interface Clients", Jun. 14, 2003.

* cited by examiner cramer andrew has sent you an online portfolio - Artist Portfolio

Cramer Andrew [                    ]

To:

You have been sent an online portfolio.

Portfolio Title:  Artist Portfolio
Sent By:          Cramer Andrew

Message:          Please check out today's portfolio.

View the online portfolio.

If you can't view this link, copy and paste the following text to your browser:
http://

This email was sent by _____. To ensure delivery to your inbox (not bulk or junk folders), please add
(                    ) to your address book.

FIG.28

SYSTEM AND METHOD FOR MANAGING CREATIVE ASSETS VIA A RICH USER CLIENT INTERFACE

CROSS-REFERENCE TO RELATED APPLICATIONS

This application claims priority from U.S. Provisional Patent Application Ser. No. 60/620,442, entitled "System for the Virtual Storage, Management, and Publishing of Media Assets via a Rich User Client Interface" and filed Oct. 21, 2004, the disclosure of which is incorporated herein by reference in its entirety.

BACKGROUND OF THE INVENTION

1. Technical Field

The present invention pertains to virtual asset management. In particular, the present invention pertains to a method and system for providing integrated virtual asset management and publishing capabilities via a rich user client interface.

2. Discussion of Related Art

Systems currently exist that are capable of allowing users to remotely store, manage and publish creative assets. A creative asset generally refers to a work (e.g., text, images, photographs, video, audio, etc.) in digital form and stored in a computer file (e.g., .jpg, .swf., .gif, .pdf, .ppt, etc.) that may be associated or formatted for use with one or more software applications. However, current management systems suffer from several disadvantages. In particular, these systems require proprietary client software to be installed on each end user machine, while extensive customization is often required to address the specific workflow and needs of a client. This customization is costly and extremely time-consuming. Further, extensive training is required for end users to utilize the systems, while the user interfaces of those systems are limited.

In addition, several obstacles exist with respect to accommodating creative assets or works. For example, conveyance of creative assets between end users is complex. One approach is to transfer the creative asset via electronic mail. However, since the creative asset file is typically large, electronic mail messages containing creative assets generally exceed message storage capacities or limits, are time-consuming to produce due to attachment of the large creative asset file, and are difficult for the recipient of the electronic mail message to open. Further, controlling client viewing of a creative asset and other attachments, and enabling a sender to incorporate comments to the attachments are difficult. Moreover, there is no central, organized storage/archive of creative assets that can be accessed and searched via a remote Internet connection. In addition, the task of automating the publishing of public and private content to the Web is time-consuming and expensive.

OBJECTS AND SUMMARY OF THE INVENTION

Accordingly, it is an object of the present invention to provide an integrated storage, management and publishing system for creative assets or works that is remotely accessed via an Internet connection.

It is another object of the present invention to enable end users to interact with a virtual asset management system through a single, integrated user interface over an Internet connection.

Yet another object of the present invention is to enable client end users to access and manage a virtual file system (e.g., a collection of folders, files, and associated metadata stored on a remote server) including creative assets or works via a direct Internet connection.

Still another object of the present invention is to enable the direct upload of plural creative assets or works into a remote virtual file repository via a drag and drop operation from an end user computer system, or via a local file system browser enabling selection of the plural creative asset files to be uploaded.

A further object of the present invention is to enable the direct upload of plural creative assets into a remote virtual file repository by sending the assets as electronic mail attachments to the remote virtual file repository.

Yet another object of the present invention is to enable end users to manage a virtual portfolio system (e.g., a collection of folders, files, and associated metadata stored on a remote server), where each folder in the virtual portfolio system represents a view (e.g., analogous to a database view) of creative assets contained in a virtual file system.

Still another object of the present invention is to enable client end users to dynamically create custom Internets (e.g., not password-protected) and Extranets (e.g., password-protected) from the virtual portfolio system by dragging creative assets from the virtual file system to the virtual portfolio system.

A further object of the present invention is to enable client end users to utilize a single interface to perform actions within both the virtual file system and the virtual portfolio system.

Yet another object of the present invention is to provide a right-click context menu that enables users to perform essential operations on virtual folders and files.

Still another object of the present invention is to provide drag and drop capabilities in a user interface of the virtual asset management system.

A further object of the present invention is to provide group select capabilities in a user interface of the virtual asset management system.

Yet another object of the present invention is to utilize double click capabilities in a user interface of the virtual asset management system that provides an expedited manner to perform common functions.

Still another object of the present invention is to enable users to control the size (e.g., including minimize) of viewing canvases, thereby allowing the user to optimize screen real estate.

A further object of the present invention is to enable users to dynamically scroll through content areas with dimensions less than those of a fixed height viewing canvas.

The aforesaid objects may be achieved individually and/or in combination, and it is not intended that the present invention be construed as requiring two or more of the objects to be combined unless expressly required by the claims attached hereto.

According to the present invention, a method and system provide integrated virtual asset management and publishing capabilities via a Rich user client interface. The client user, via a Rich user client interface, communicates with a central application server to store and manage creative assets or works, and to publish those works to other end users. The user interaction is conducted within a single instance of a Web browser session.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 28 is a schematic illustration of an exemplary electronic mail message generated and sent by the virtual asset management system in order to publish a portfolio.

DETAILED DESCRIPTION OF THE PREFERRED EMBODIMENTS

The present invention may be used to manage and publish virtual or creative assets or works including audio, images, videos and text. These assets are generally in digital form and stored in a computer file (e.g., .jpg, .swf., .gif, .pdf, .ppt, etc.) associated with or formatted for various software applications. Rich Internet Applications (RIAs) execute from a single instance of a Web browser session to provide user experiences or functionalities that are generally limited and difficult to implement with current existing Web technologies. For example, the functionalities may include drag and drop operations commonly used for manipulating files (and sometimes text) within a graphical user interface environment (e.g., moving the cursor or pointer over an icon (representing a file) and actuating a mouse button, where the button remains depressed while moving the pointer (e.g., dragging the file) to another place and is released (e.g., dropping the file) to transfer the file to the desired location), implementing context menus (e.g., a popup menu that appears when a right-click mouse operation is performed over an object displayed on the computer screen, where the menu includes a list of functions that may be performed on the selected object), group selection, animation and SVG/vector graphics. The Rich Internet Applications combine the functionality of desktop software applications with the broad reach and low-cost deployment of Web applications, thereby resulting in significantly more intuitive, responsive and effective user experiences. The result is an interactive user interface that simulates the functionality of desktop software, but is deployed over the Web in a lightweight, and cost effective manner. User interaction is intuitive and deployment is almost instantaneous.

By way of example only, the Rich Internet Applications of the present invention may be implemented by Macromedia Flash 7.0 applications. This type of application includes several features offered by Macromedia Flash MX Professional 2004 including: innovative and extensive use of the V2 component set; creation of custom components following the V2 event model and component architecture; use of themes, stylesheets and advanced skinning to control the application look and feel; consuming Web services using custom classes leveraging the MX services package; data binding using typed Actionscript 2 objects and interfaces; creation of custom context menu items to copy, paste, delete, etc. visual items/data; animation and tweens using the MX transitions package; and version control of the Flash Project using Visual SourceSafe.

Figure 1:
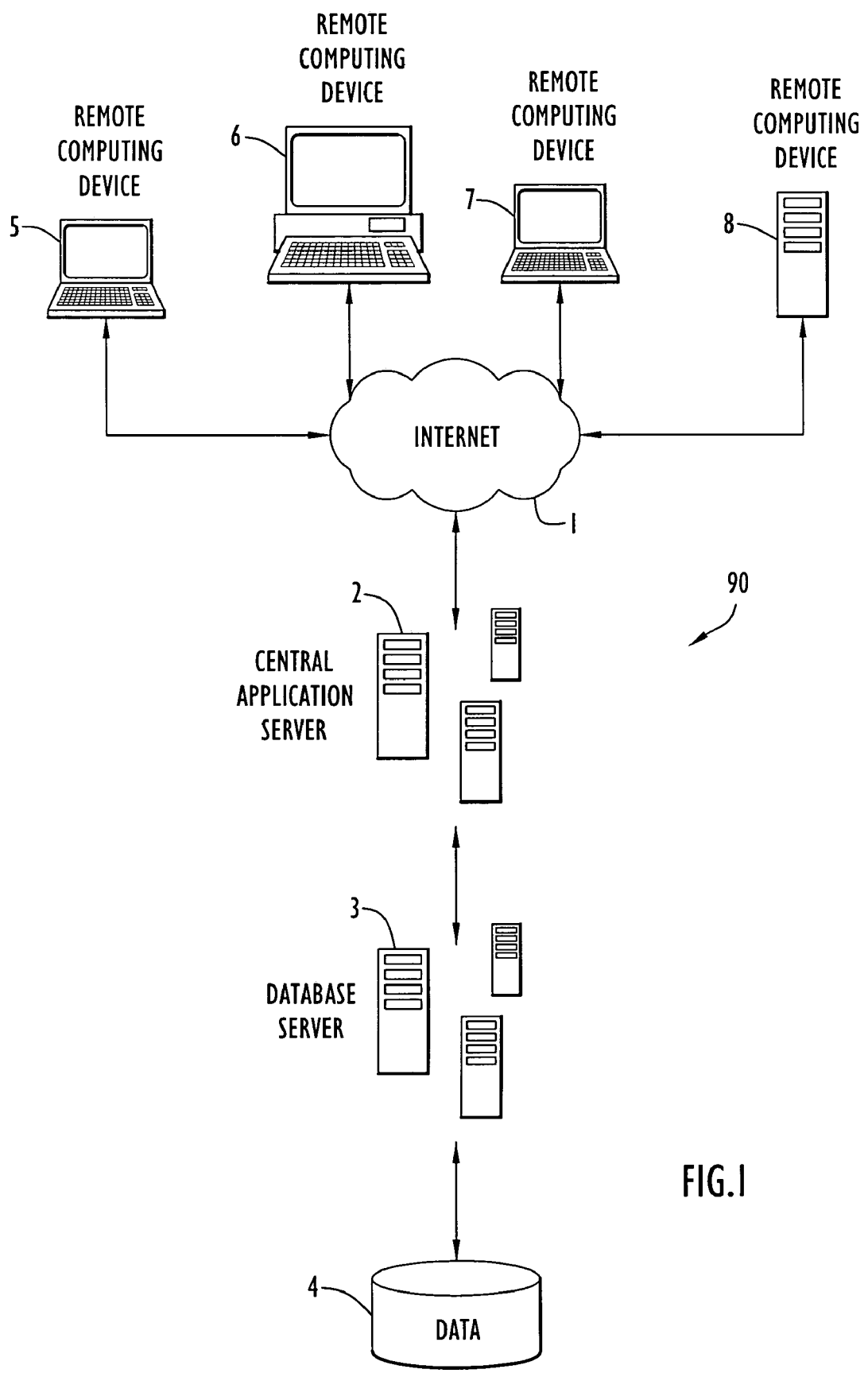
FIG. 1 is a diagrammatic illustration of the overall architecture of the virtual asset management system of the present invention.

A management system 90 for managing creative assets or works according to the present invention is illustrated in FIG. 1. The system enables users to work from computer systems with an Internet connection. The system further enables users to store and manage virtual or creative assets or works and to publish those assets to other end users from a single integrated interface. The assets are generally in digital form and stored in a computer file (e.g., .jpg, .gif, .swf, .pdf, .ppt, etc.) associated or formatted for use with one or more software applications.

System 90 includes end user systems or remote computing devices 5 (e.g., laptop), 6 (e.g., personal computer or workstation), 7 (e.g., laptop) and 8 (e.g., personal computer) each coupled to a central application server 2 via a communication network 1, preferably the Internet. The remote computing devices may be implemented by any conventional or other computer or processing systems (e.g., laptops, personal computers, workstations, etc.) with any conventional operating system (e.g., Windows, Macintosh, Unix, LINUX, etc.). Central application server 2 transfers data with the remote computing devices via the communication network. The central application server is further coupled to a database server system 3 to store and retrieve data within an associated data storage unit 4.

Figure 2:
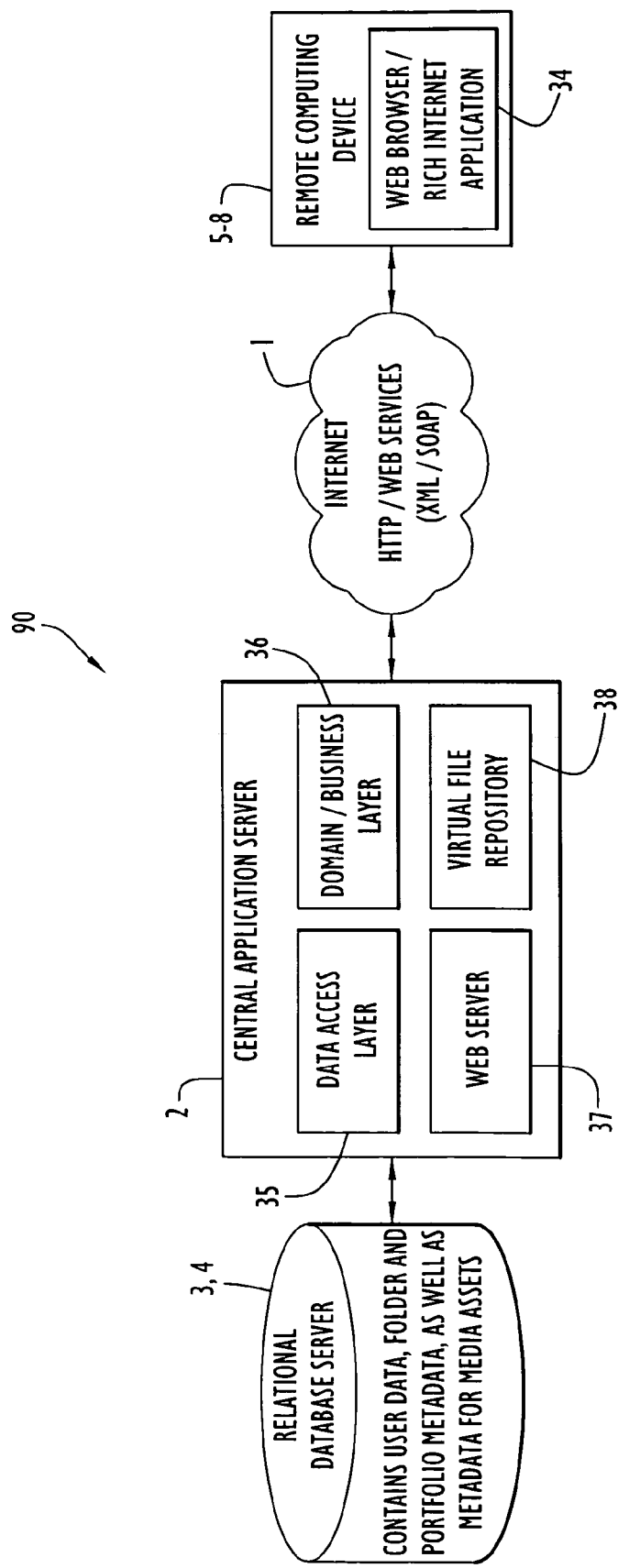
FIG. 2 is a block diagram of the system architecture of the virtual asset management system of FIG. 1.

Referring to FIG. 2, each remote computing device may establish communications with central application server 2. A user interacts with the central application server to store, manage and publish creative assets via a Rich Internet Application (RIA) 34 residing on the remote computing device associated with that user. Communication between the central application server and the remote computing devices is bi-directional, where users connect to the central application server by interacting with a visual interface provided by the embedded Rich Internet Application. Rich Internet Application 34 interprets the actions submitted by the user and generates a standards-based (e.g., SOAP/XML) Web Service request to central application server 2. The central application server subsequently processes each Web Server Request and sends the appropriate SOAP/XML response back to Rich Internet Application 34. The Web Services enable discrete units of application-level functionality to be exposed across the network (for client consumption).

The central application server may be implemented by any conventional or other computer or processing systems (e.g., personal computer, server, etc.) with any conventional operating system and software (e.g., Windows, Unix, LINUX, communications/server software, etc.). The central application server preferably includes an n-tier architecture including a generic data access layer that supports plural relational databases for data storage, a domain layer that supports fulfillment of business processes, and a Web services layer accessible to remote clients. In particular, central application server 2 includes a Web server 37, a virtual file system 38, a domain/business layer 36 and a data access layer 35. Web server 37 is responsible for handling HTTP/Web Service requests initiated by an end user. The virtual file system stores creative assets uploaded from an end user system and generally represents a remote file system (e.g., a collection of folders, files, and associated metadata that are stored on the central application server). The virtual file system is generally a centralized area for end users to store and manage creative assets. Domain/business layer 36 includes logic for encapsulating the business processes supported by the system, while data access layer 35 provides a mechanism for data storage and retrieval from database storage servers 3, preferably implemented by relational database servers (e.g., Microsoft SQL Server, Oracle Database 10g, MySQL, PostgreSQL, etc.). Relational database server 3 stores user data, folder and portfolio metadata and metadata for creative assets stored in virtual file system 38.

Figure 3:
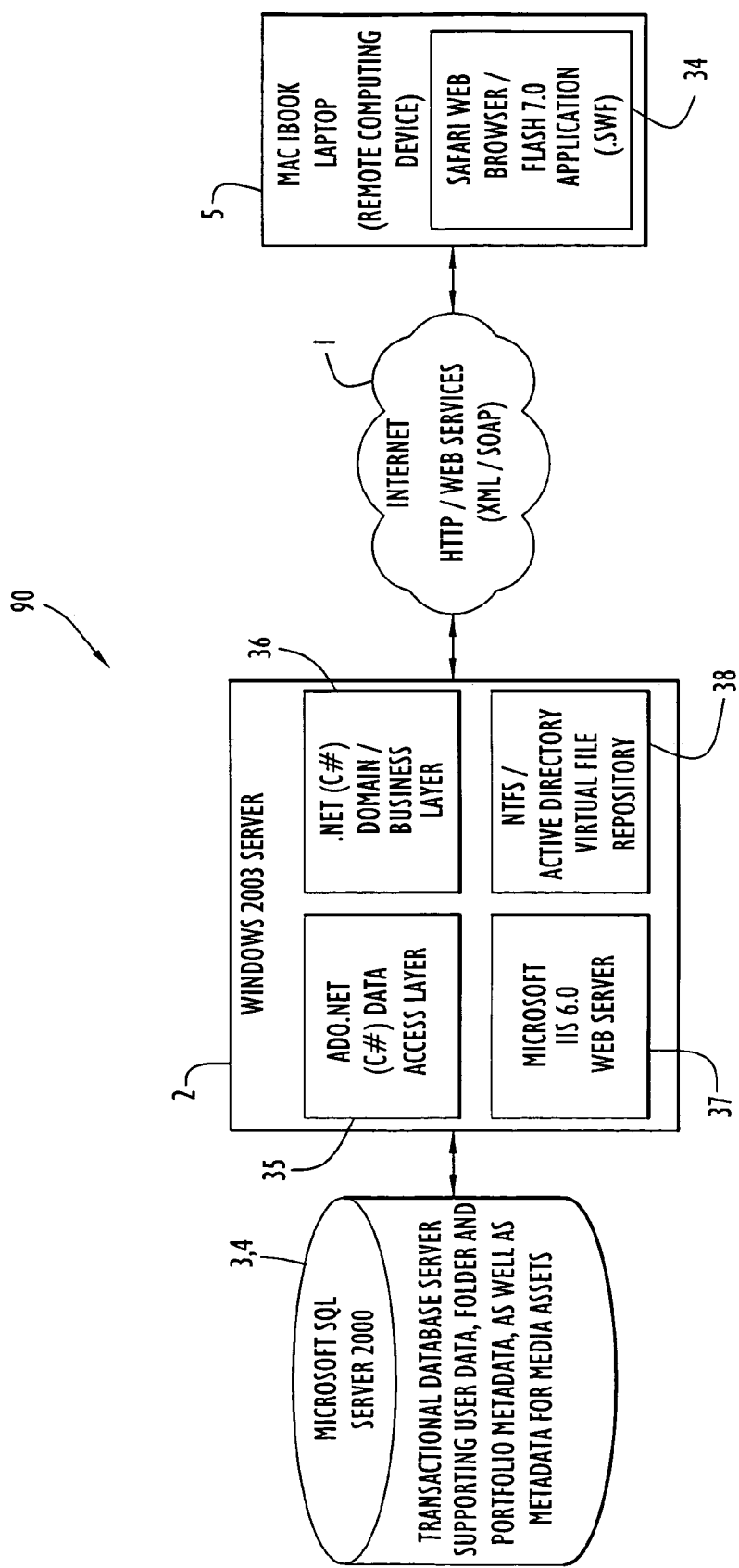
FIG. 3 is a block diagram of an exemplary system architecture of the system of FIG. 1.

An exemplary implementation of system 90 is illustrated in FIG. 3. By way of example only: database server 3 is implemented by Microsoft SQL Server 2000 (e.g., an enterprise-level transaction-supported relational database sever); central application server 2 is implemented by a Windows 2003 Server, where Web server 37 is implemented by Microsoft Internet Information Services (IIS) 6.0 Web Server, virtual file system 38 is implemented by Windows Active Directory/NTFS File System, domain/business layer 36 is implemented in the C# computing language for the Microsoft .Net platform, and data access layer 35 is implemented in the ADO.Net/C#. IIS 6.0 computing language; communications network 1 is implemented by an Internet Communication Network; and remote computing device 5 is implemented by a MAC laptop machine.

An end user establishes communications with server 2 via remote computing device 5 to store, manage and publish creative assets through the visual interface provided by Rich Internet Application 34 as described above. The Rich Internet Application is preferably implemented by an embedded Flash 7.0 application. Communication between the central application server and the remote computing devices is bi-directional, where users connect to the central application server by interacting with the visual interface provided by the embedded Rich Internet Application as described above. Rich Internet Application 34 interprets the actions submitted by the user and generates a standards-based (e.g., SOAP/XML) Web Service request to central application server 2. The central application server subsequently processes each Web Server Request and sends the appropriate SOAP/XML response back to Rich Internet Application 34 as described above.

Figure 4:
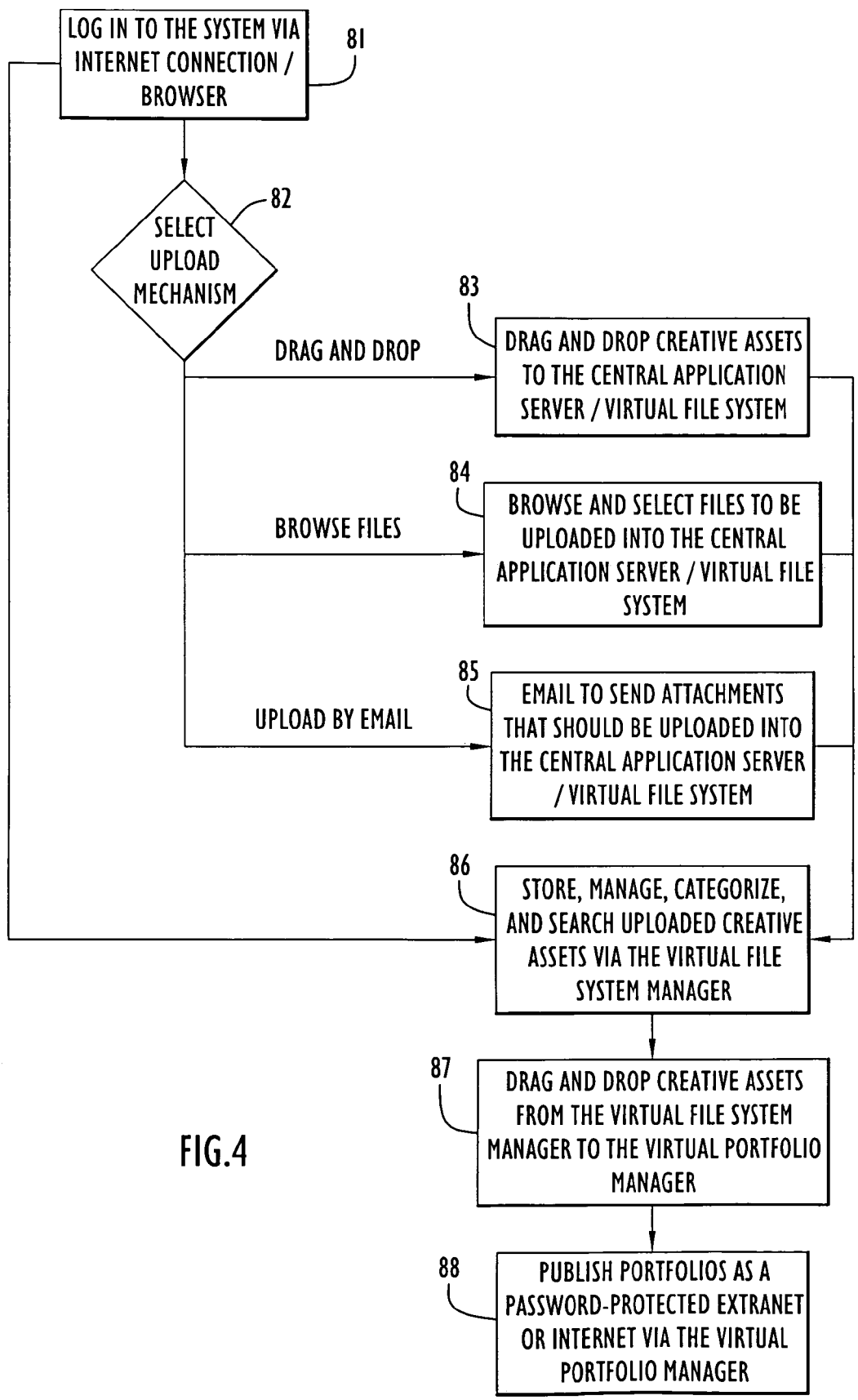
FIG. 4 is a procedural flow chart illustrating the manner in which the virtual asset management system manages creative assets or works according to the present invention.

The manner in which system 90 stores, manages and publishes creative assets is illustrated in FIG. 4. Specifically, a user accesses a system Web page using a Web browser on an end user system 5-8 (FIG. 1) at step 81. The web page typically resides on central application server 2 and includes an embedded Rich User Application (e.g., Flash application) providing a user interface enabling the user to log into or gain access to system 90. In response to a successful authentication, the user may choose to upload files from the local file system on the end user system to virtual file system 38 (FIG. 2) on central application server 2. The user subsequently selects an upload mechanism at step 82 to transfer files from the end user system to the virtual file system. In particular, the user may perform a drag and drop operation at step 83, where the creative assets may be transferred to the virtual file system by manipulation of icons on the end user screen as described below. The user may alternatively browse files at step 84 to select files from a local file system directory for transfer to the virtual file system as described below, or upload a creative asset by sending that asset to the central application server as an attachment within an electronic mail message at step 85. This electronic mail function enables transfer of electronic mail file attachments directly into the virtual file system.

Once files are uploaded to virtual file system 38, users can store, manage, categorize, and search uploaded creative assets via a virtual file system manager at step 86 as described below. In order to publish creative assets stored in the virtual file system to other end users, the user may drag and drop creative assets directly from the virtual file system manager into a virtual portfolio manager at step 87 and subsequently publish the asset as an Extranet or Internet via the virtual portfolio manager at step 88 as described below.

Figure 5:
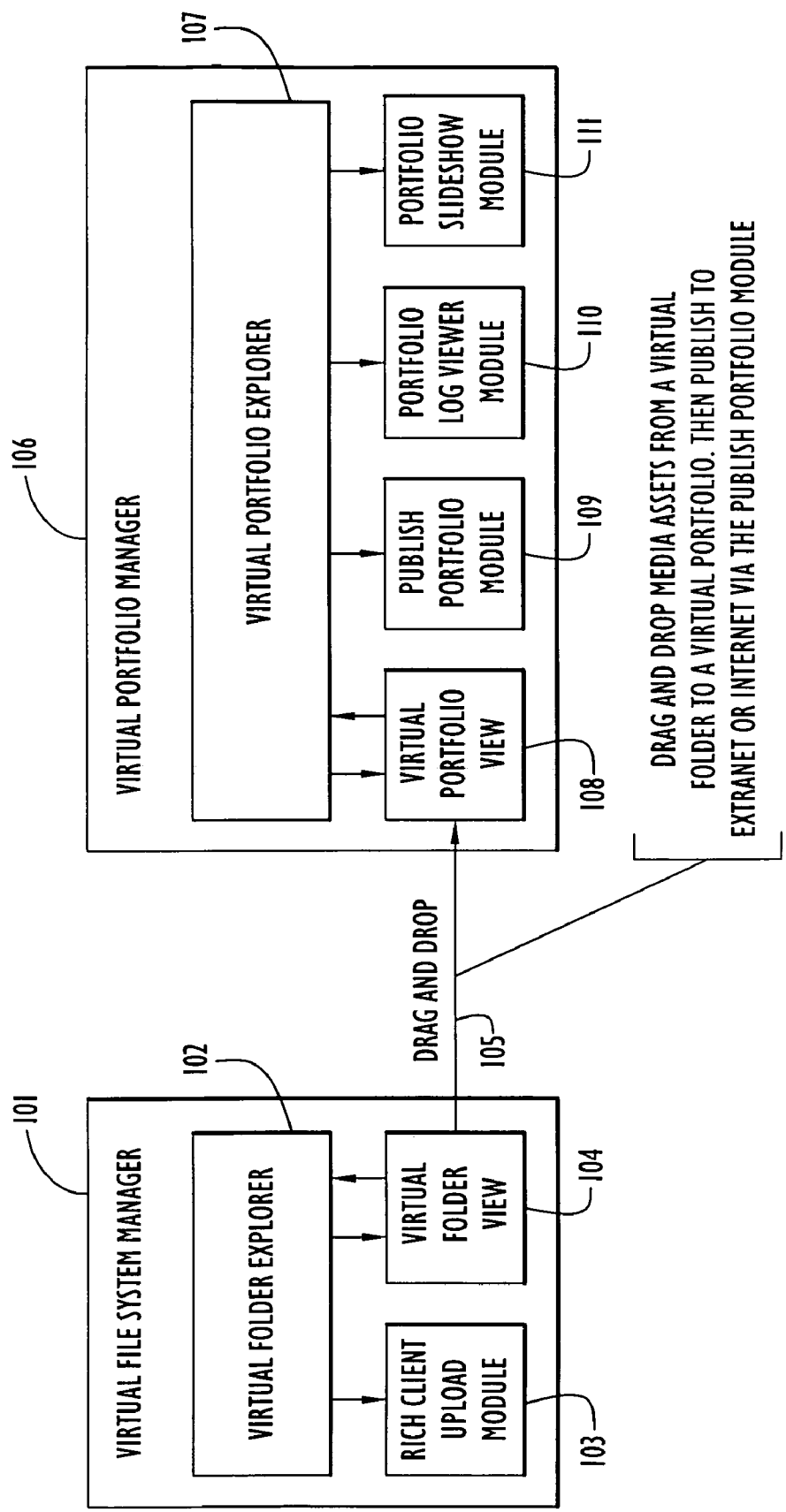
FIG. 5 is a block diagram of the software architecture for the virtual asset management system according to the present invention.

The interface modules for system 90 are illustrated in FIG. 5. In particular, system 90 includes a virtual file system manager module 101 and a virtual portfolio manager module 106. Virtual file system manager 101 serves as an interface for managing virtual file system 38 (FIG. 2) and enables users to store and manage content residing in the virtual file system. Virtual file system manager 101 includes a virtual folder explorer module 102, a Rich Client upload module 103 and a virtual folder view module 104 as described below.

Virtual portfolio manager 106 serves as an interface for managing the virtual portfolio system or virtual portfolios and enables users to publish assets that are stored in the virtual file system. The virtual portfolio system generally refers to a collection of portfolios, creative assets, and associated metadata stored on a remote server, where a portfolio typically represents a customized view of the creative assets within the virtual file system. A portfolio may be accessed by other users via a password-protected Extranet or the Internet. Virtual portfolio manager 106 includes a virtual portfolio explorer module 107, a virtual portfolio view module 108, a publish portfolio module 109, a portfolio log viewer module 110 and a portfolio slideshow module 111, each as described below. The portfolio log viewer module enables a user to view a history log maintained by the system with respect to portfolio activity, while the portfolio slideshow module enables viewing of a selected portfolio as described below. Creative assets may be transferred from the virtual file manager to the virtual portfolio manager via drag and drop operations 105 in order to publish those assets as described below.

Manager modules 101 and 106 typically reside within domain/business layer 36 (FIG. 2) and interact with data access layer 35, Web server 37 and virtual file repository 38 to perform the functions described herein. These manager modules are tightly integrated, preferably utilizing the same workspace and include a similar look and feel. Manager modules 101 and 106 further leverage the capabilities of a Rich Internet Application (RIA) (e.g., a Flash application) and support drag and drop operations, group select operations, right-click context menus and resizable interfaces as described below.

Figure 6:
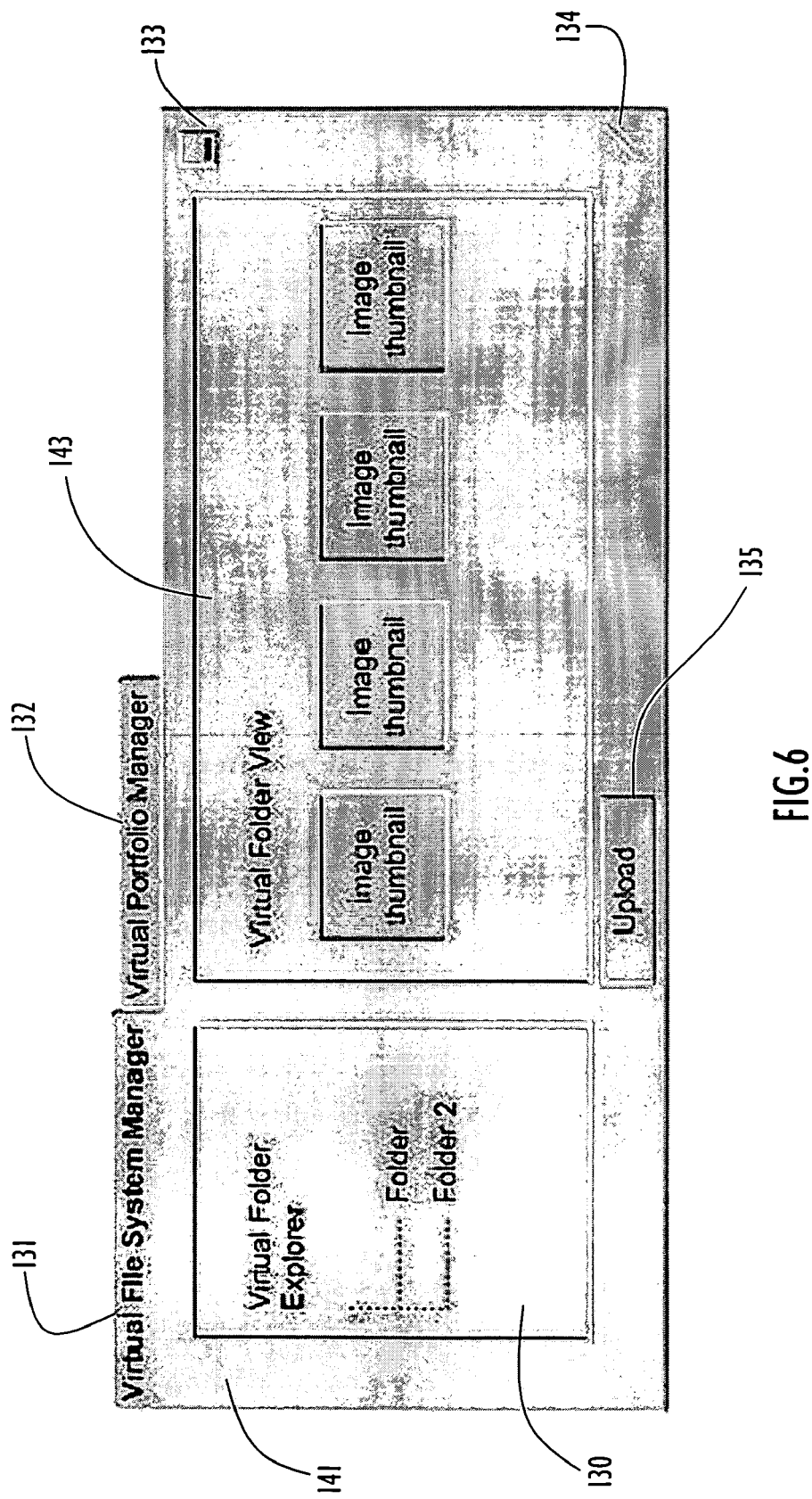
FIG. 6 is a schematic illustration of an exemplary graphical user screen employed to navigate between file and portfolio manager interfaces of the virtual asset management system with the user screen configured to display the file manager interface.
Figure 7:
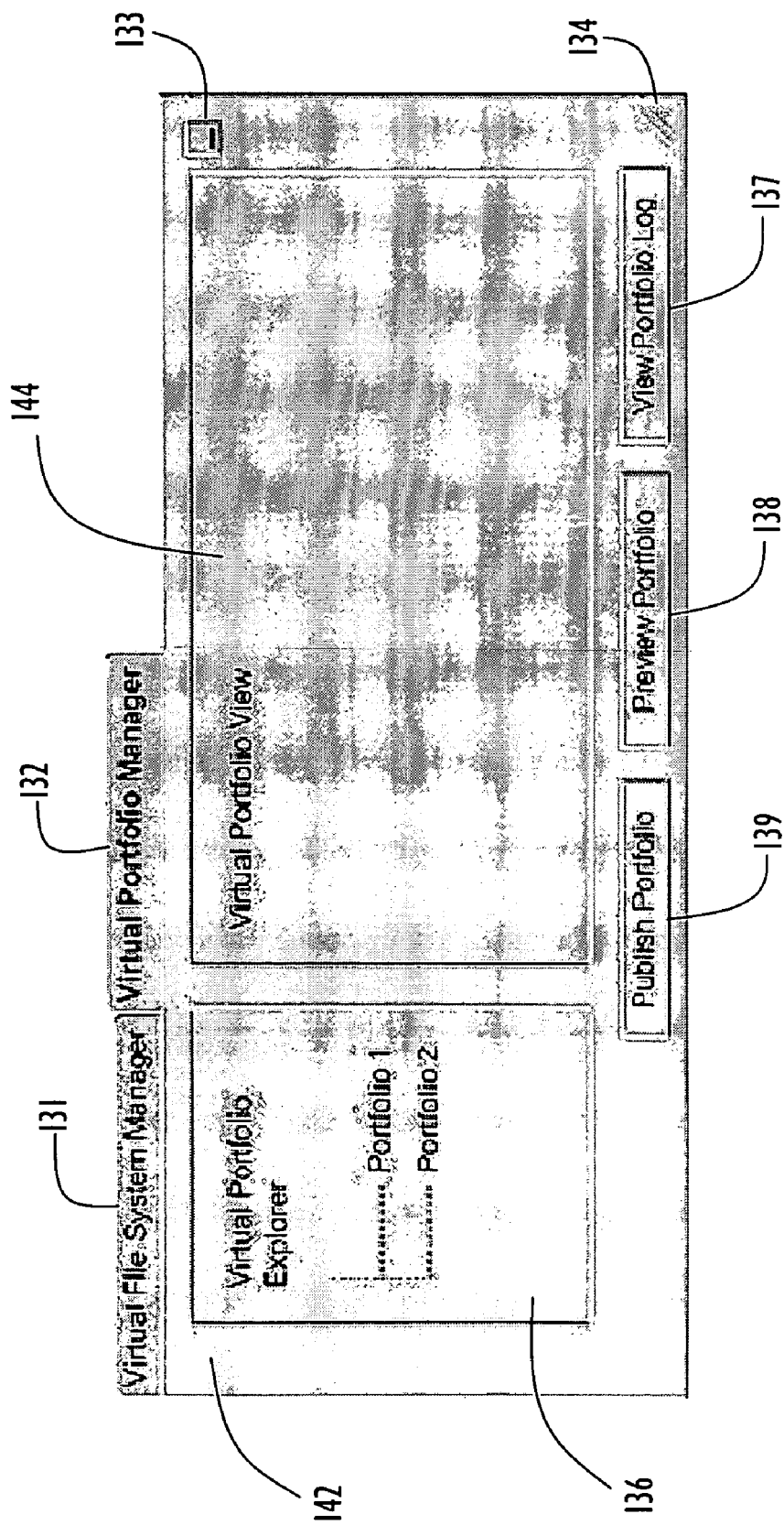
FIG. 7 is a schematic illustration of an exemplary graphical user screen employed to navigate between file and portfolio manager interfaces of the virtual asset management system with the user screen configured to display the portfolio manager interface.
Figure 8:
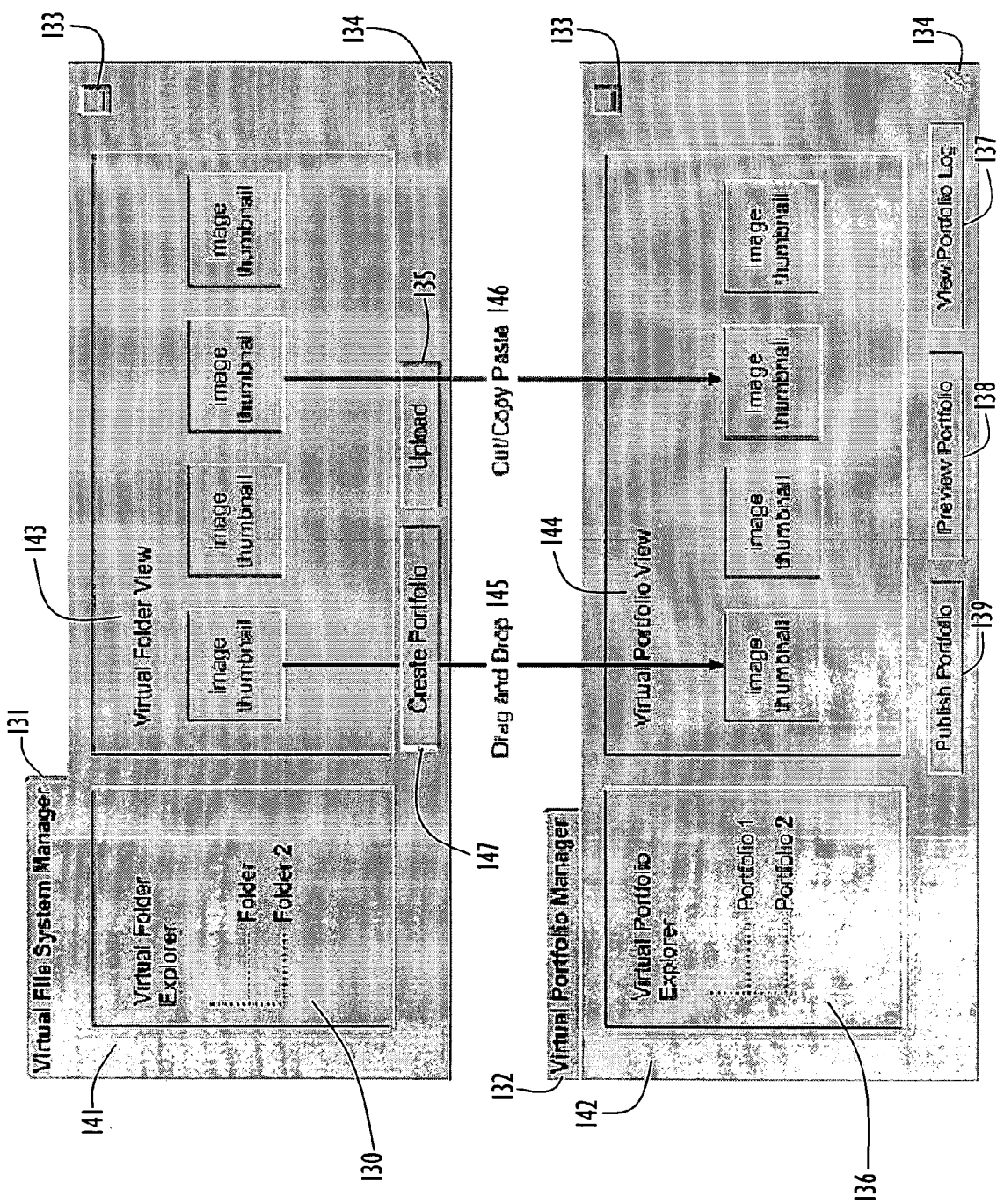
FIG. 8 is a schematic illustration of an exemplary graphical user screen arranged in a split screen fashion to transfer files between the file and portfolio manager interfaces of the virtual asset management system.

Exemplary graphical user screens employed by the virtual file system and virtual portfolio managers are illustrated in FIGS. 6-8. In particular, the user screen for managers 101 and 106 include a "tabbed" user interface (FIG. 6) with a file system manager tab 131 and a portfolio manager tab 132. The user may navigate between the virtual file system manager interface and the virtual portfolio manager interface via actuation of tabs 131, 132. The screen further includes icons or symbols 133, 134 to enable users to respectively minimize and resize the user interface. This enhances screen use by providing a user with the capability to specify the size of the screen working area.

The managers screen with the file system manager tab selected is illustrated in FIG. 6. Actuation of this tab provides a file system manager interface 141. The file system manager interface includes a folder selection area 130, a folder view area 143 and an upload button 135. Interface 141 further includes icons or symbols 133, 134 to enable users to respectively minimize and resize the interface as described above. The folder selection area includes a directory listing of folders within the virtual file system, while the folder view area provides thumbnail images of the creative assets within a folder selected by a user in the folder selection area. Actuation of upload button 135 enables a creative asset to be transferred from the end user system to the folder selected by a user within the folder selection area.

The managers screen with the portfolio manager tab selected is illustrated in FIG. 7. Actuation of this tab provides a portfolio manager interface 142. The portfolio manager interface includes a portfolio selection area 136 and a portfolio view area 144. Interface 142 further includes icons or symbols 133, 134 to enable users to respectively minimize and resize the interface as described above. The portfolio selection area includes a directory listing of portfolios within the virtual file system, while the portfolio view area provides thumbnail images of the creative assets within a portfolio selected by a user in the portfolio selection area.

In addition, interface 142 further includes a view portfolio log button 137, a preview portfolio button 138 and a publish portfolio button 139. Preview portfolio button 138 enables the selected portfolio to be viewed via portfolio slideshow module 111 as described below, while view portfolio log button 137 enables viewing of a history log as described above. Actuation of publish portfolio button 139 enables a selected creative asset and/or portfolio to be published as described below.

The manager screen with the tabbed sections or user interfaces separated to form a "split screen" in response to a user command is illustrated in FIG. 8. Initially, manager interface screens 141 and 142 are substantially similar to the interfaces described above, where file system manager interface 141 further includes a create portfolio button 147. The arrangement of the interfaces provides various manners for a user to publish files from file system manager interface 141 to portfolio manager interface 142. In particular, a user may perform a drag and drop operation 145 to transfer one or more selected creative assets from folder view area 143 of interface 141 to portfolio view area 144 of interface 142. Further, a user may leverage a context menu to perform a copy or paste operation 146 to transfer one or more creative assets from folder view area 143 of interface 141 to portfolio view area 144 of interface 142. The user selects creative assets by group selecting one or more thumbnail files within folder view area 143. In addition, the user may actuate create portfolio button 147. This provides an expedited manner to create a portfolio within portfolio areas 136 and/or 144, where an exact replica of the currently selected folder within folder areas 130 and/or 143 is created as a portfolio within portfolio areas 136 and/or 144.

Figure 9:
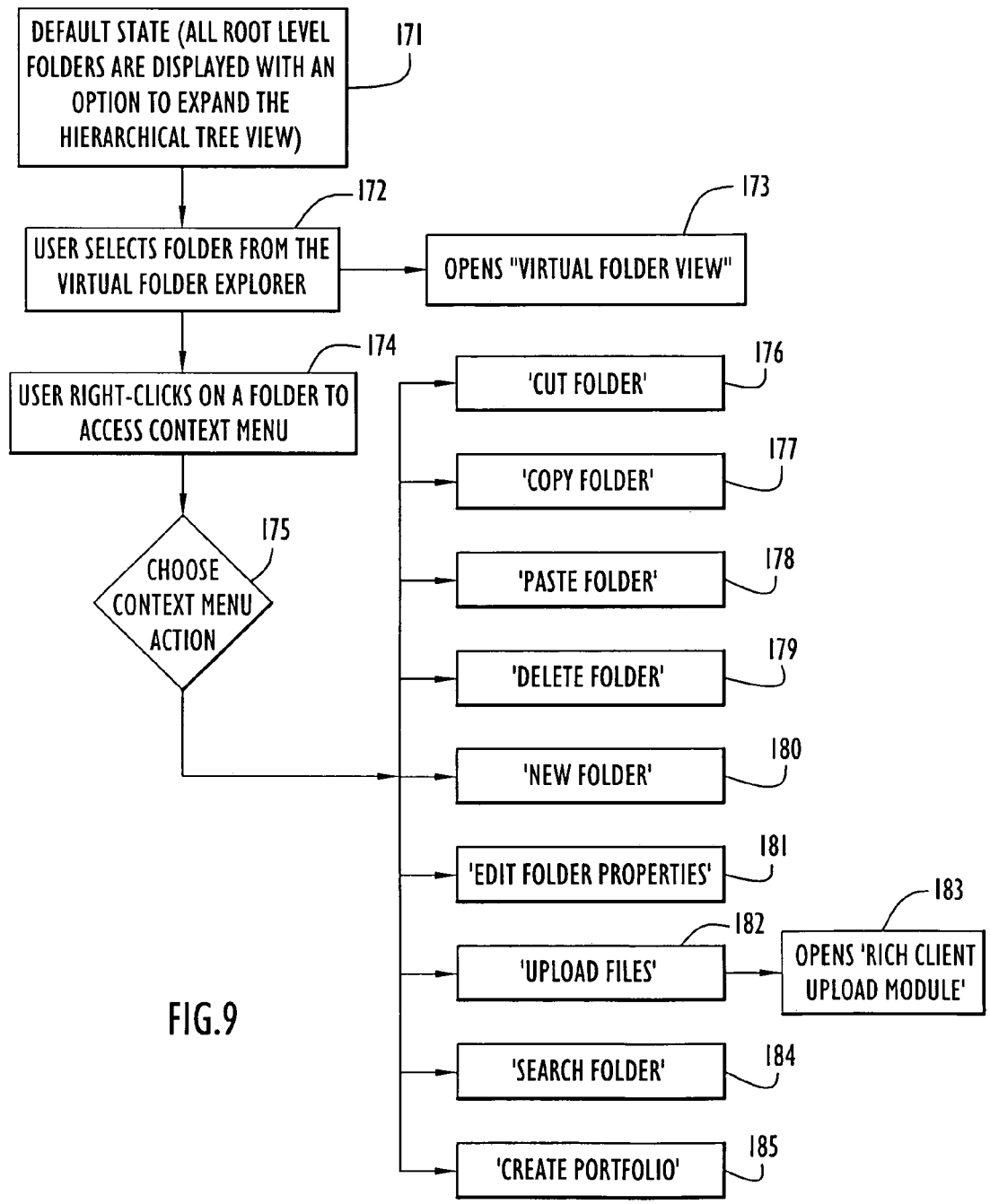
FIG. 9 is a procedural flow chart illustrating the manner in which the virtual asset management system enables viewing and selection of creative assets or works by users according to the present invention.

The manner in which virtual folder explorer module 102 (FIG. 5) manages folders is illustrated in FIG. 9. The virtual folder explorer serves as an interface for virtual file system manager 101 and enables users to organize and manage a hierarchical tree structure of nested folders. These folders include the files within the virtual file system. In particular, the virtual folder explorer initially resides in a default state and displays root-level folders within the system previously created by other users at step 171. A user may select a folder at step 172, where the system opens a view of the selected folder at step 173 as described below. The user may further right-click on a folder via a mouse to display a context menu of folder operations at step 174. These operations may be selected at step 175 and are performed by leveraging the capabilities of a Rich Internet Application (RIA) (e.g., a Flash application). The operations include cut folder (e.g., removes a folder, step 176), copy folder (e.g., provides a copy of a folder for placement at another location, step 177), paste folder (e.g., inserts cut folders, step 178), delete folder (e.g., removes a folder, step 179), new folder (e.g., creates a new folder, step 180), edit folder properties (e.g., enables modification of folder characteristics, step 181), upload files (e.g., enables upload of files from an end user system, step 182), search folder (e.g., enables searching of folders, step 184) and create portfolio (e.g. creates a portfolio with contents of a folder, step 185). Users may upload creative assets directly into a specified folder at step 182 by utilizing a Rich Client upload module at step 183 as described below.

Figure 10:
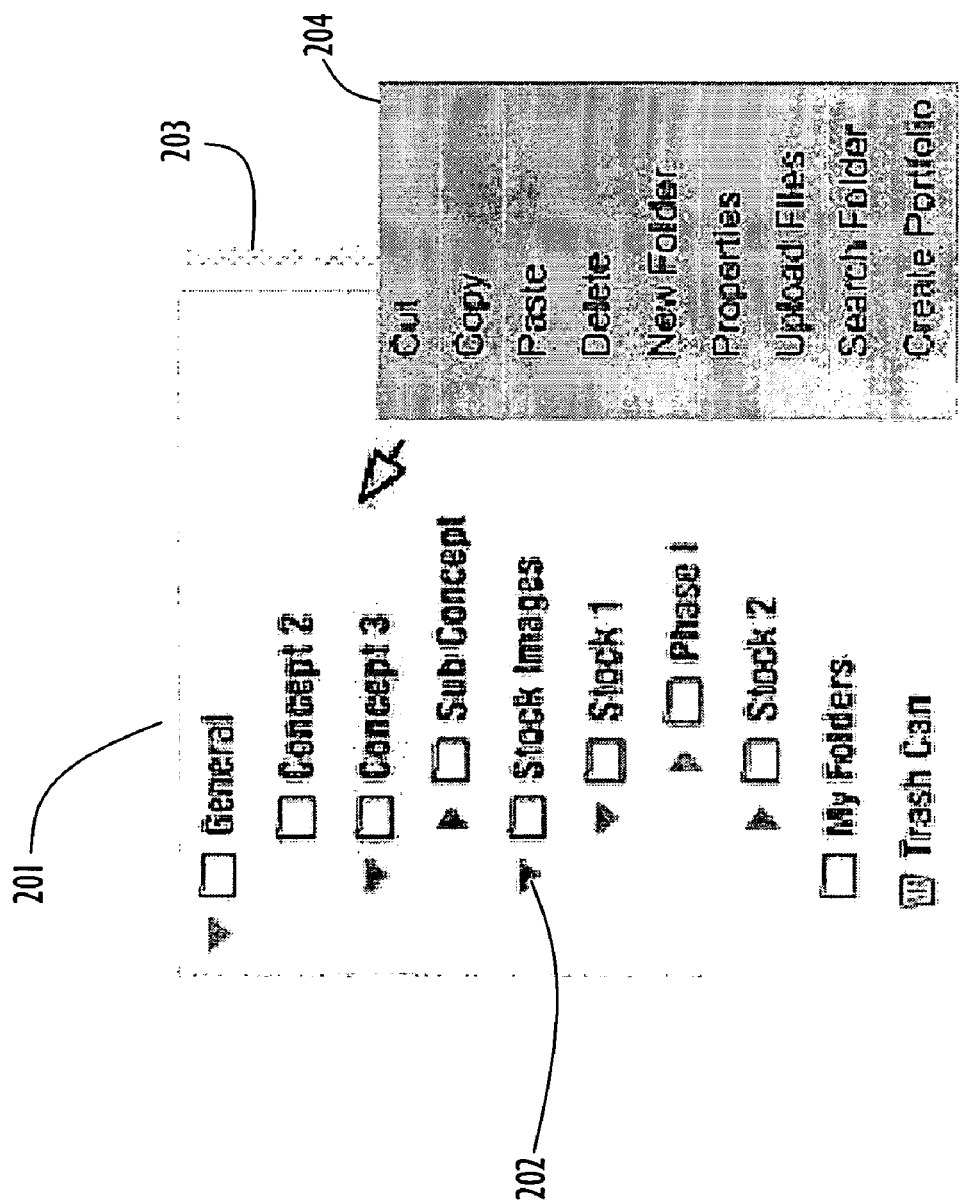
FIG. 10 is a schematic illustration of an exemplary graphical user screen displaying the architecture of storage folders for creative assets or works within the virtual asset management system.

An exemplary graphical user screen utilized by the virtual folder explorer is illustrated in FIG. 10. Specifically, screen 201 includes a window 203 including a hierarchical tree structure 202 of folders within the virtual file system. Users may expand and contract folders within tree structure 202 to display and/or hide sub-folders. A user may select folders from the tree structure directory and perform various operations to manage the folders via a context menu 204 as described above. In addition, users may click and drag boundaries of window 203 to expand the horizontal viewing area. The virtual folder explorer leverages the capabilities of a Rich Internet Application (RIA) (e.g., Flash application) to enable a user to interact with the remote virtual file system as if that system resided on the end user desktop.

Figure 11:
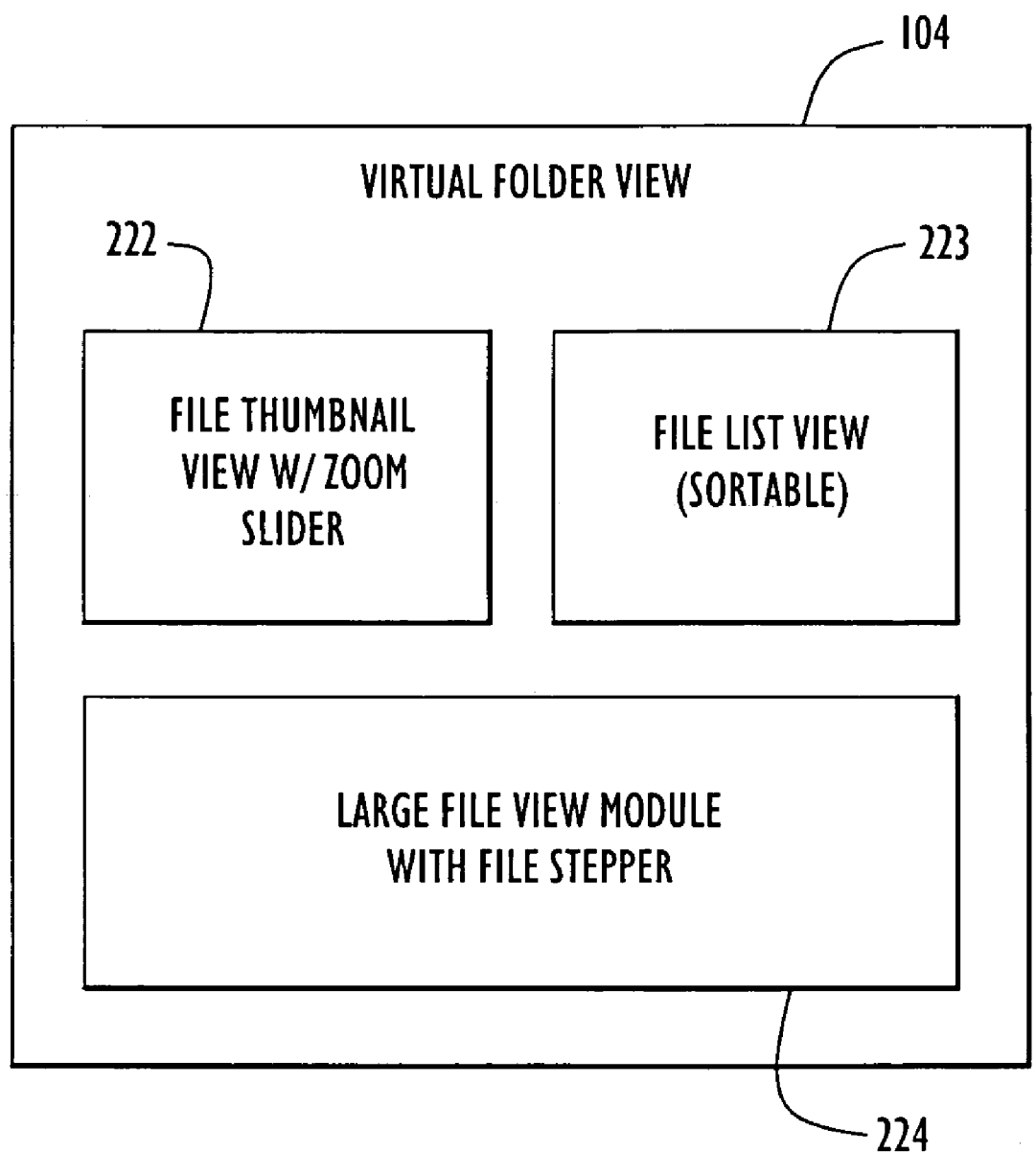
FIG. 11 is a block diagram of the software architecture for managing system folders according to the present invention.

Virtual folder view module 104 of virtual file system manager 101 (FIG. 5) is illustrated in FIG. 11. In particular, virtual folder view module 104 includes a file thumbnail view module 222, a file list view module 223, and a large file view module 224. File thumbnail view module 222 displays thumbnail representations of the files in a selected folder as described below, while file list view module 223 displays a sortable, list view representation of the files in a selected folder as described below. Large file view module 224 displays a large view representation of a single file as described below. Modules 222, 223 and 224 are tightly integrated, preferably utilize the same workspace and leverage the capabilities of a Rich Internet Application (RIA) (e.g., a Flash application) to support drag and drop operations and right-click context menus as described below.

Figure 12:
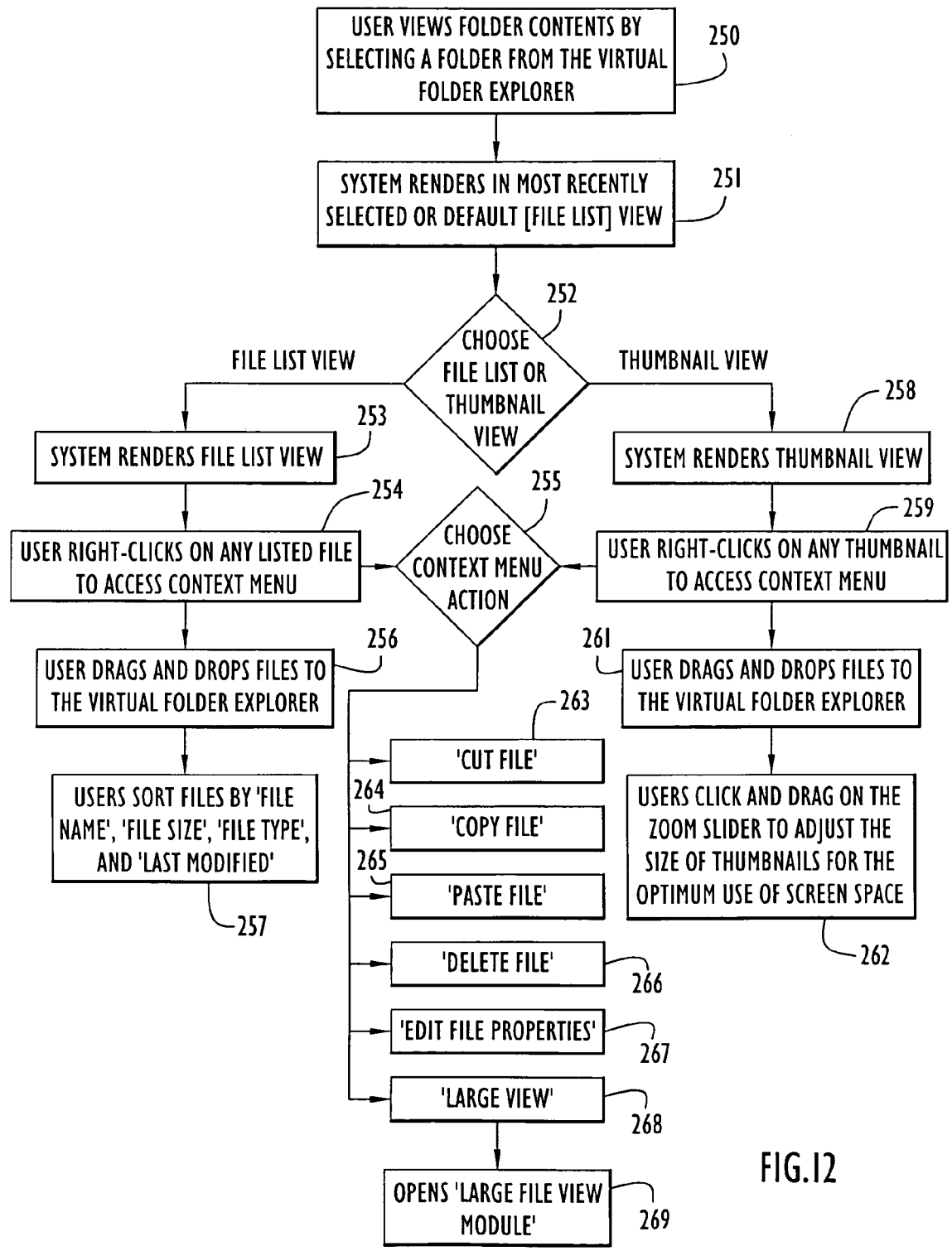
FIG. 12 is a procedural flow chart illustrating the manner in which the virtual asset management system enables viewing and manipulation of creative assets or works within folders according to the present invention.

The manner in which virtual folder view module 222 (FIG. 11) manages folders is illustrated in FIG. 12. Initially, the virtual folder view interface (FIGS. 13-14) is loaded when a user selects a folder from the virtual folder explorer (e.g., step 173 of FIG. 9) at step 250. The virtual folder view module resides in a default state and renders a file list view (FIG. 13) at step 251. This view contains a sortable list of files contained in a selected folder and is maintained at step 253 in response to selection of this type of view by a user at step 252. The user may perform a drag and drop operation at step 256 in order to move or copy files from the file list view to a desired folder. Plural files may be selected for transfer using a group select operation. Files may further be sorted by a file attribute (e.g. "File Name", "File Size", "File Type", "Last Modified", etc.) at step 257.

Alternatively, the user may right-click on a folder via a mouse to display a context menu of folder operations at steps 254, 255. The operations (e.g., cut, paste, copy, delete) support group selection, thereby enabling users to perform simultaneous operations on plural files. The context menu operations are performed by leveraging the capabilities of a Rich Internet Application (RIA) (e.g., Flash application) and include cut file (e.g., removes a file, step 263), copy file (e.g., provides a copy of a file for placement at another location, step 264), paste file (e.g., inserts cut files, step 265), delete file (e.g., removes a file, step 266), edit file properties (e.g., enables modification of file characteristics, step 267) and large view (e.g. enables viewing of a file, step 268). Users can load a large view representation of a single file in the selected folder view at step 268 by utilizing large file view module 224 at step 269 as described below.

When a user switches from the file list view to a file thumbnail view at step 252, the file thumbnail view is displayed at step 258 including a thumbnail representation of files contained in a selected folder. The user may perform a drag and drop operation at step 261 in order to move or copy files from the file thumbnail view to a desired folder. Plural files may be selected for transfer using a group select operation. The user may further click and drag on a zoom slider to dynamically adjust the size of the thumbnails at step 262 as described below. Alternatively, the user may right-click on a folder via a mouse to display a context menu of folder operations at steps 255, 259. The operations support group selection (e.g., cut, paste, copy, delete), thereby enabling users to perform simultaneous operations on plural files as described above. The context menu operations are performed by leveraging the capabilities of a Rich Internet Application (RIA) (e.g., Flash application) and include the operations described above for the file list view.

Figure 13:
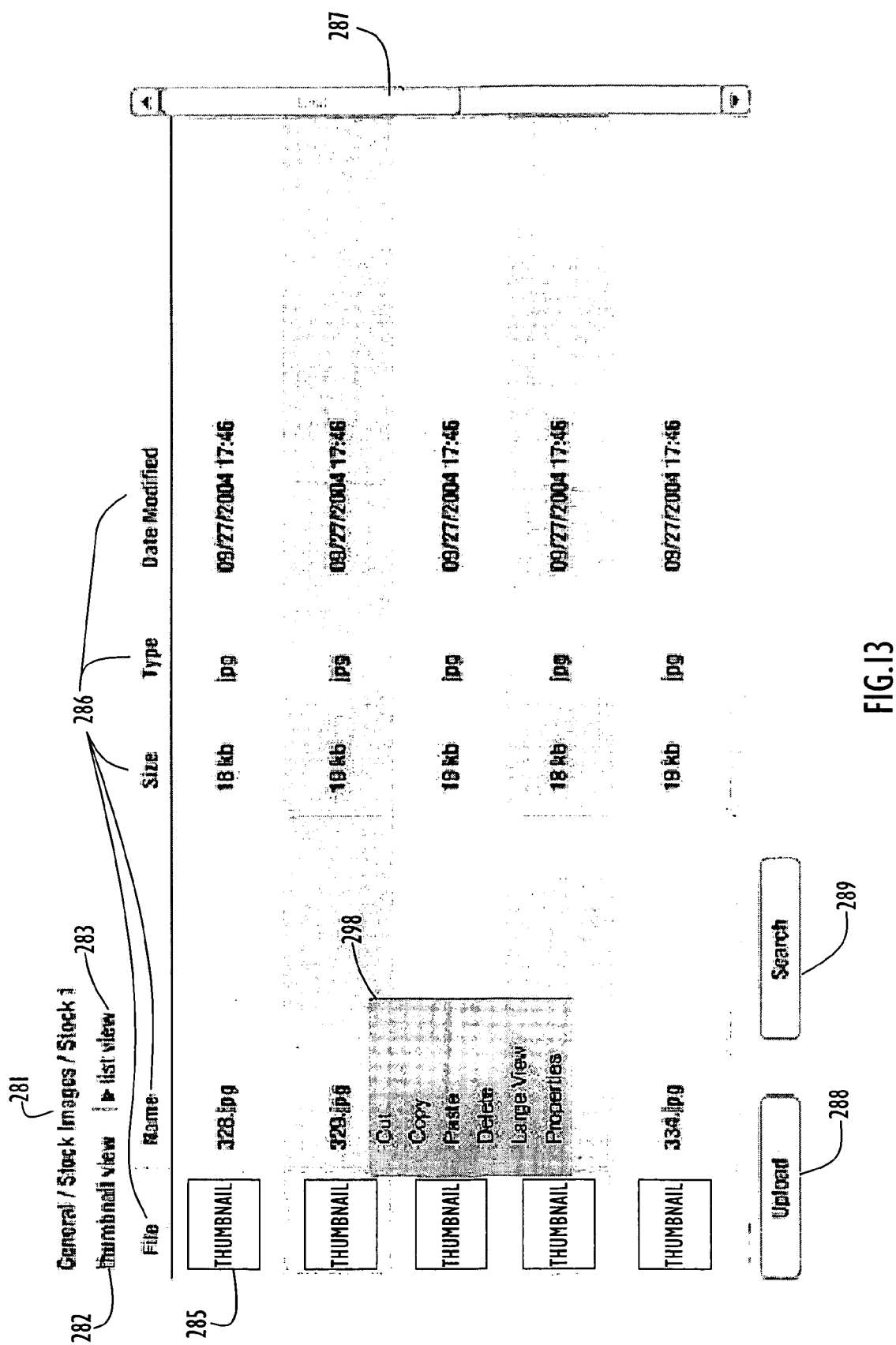
FIG. 13 is a schematic illustration of an exemplary graphical user screen displaying the various creative assets of a selected folder in the form of a file list.

An exemplary graphical user screen employed by file list view module 223 is illustrated in FIG. 13. Specifically, file list screen 281 includes a list of files corresponding to a selected folder and rendered in a columnar or table format. The table columns or metadata 286 associated with each file include "File", "Name", "Size", "Type" and "Date Modified". Actuating a column header 286 sorts the list according to the selected attribute. The file column includes thumbnail representations 285 of each file, where double-clicking on a thumbnail representation 285 of a file provides a large view of that file as described below. Screen 281 further includes a vertical scroll bar 287, a thumbnail view icon 282, a list view icon 283, an upload button 288 and a search button 289. The scroll bar enables a user to dynamically scroll through an entire list of files in a fixed pane. Thumbnail and list view buttons 282, 283 enable a user to toggle between file list and thumbnail views (e.g., FIGS. 13 and 14). Actuation of upload button 288 uploads a file from an end user system to the selected folder, while actuation of search button 289 enables a user to search for specific files. In addition, a user may perform various operations from a right-click context menu 298 to manage a file within the context of the system. The menu includes the operations described above (e.g., cut, paste, copy, delete, etc.) and supports group select operations to enable users to perform simultaneous operations on plural files.

Figure 14:
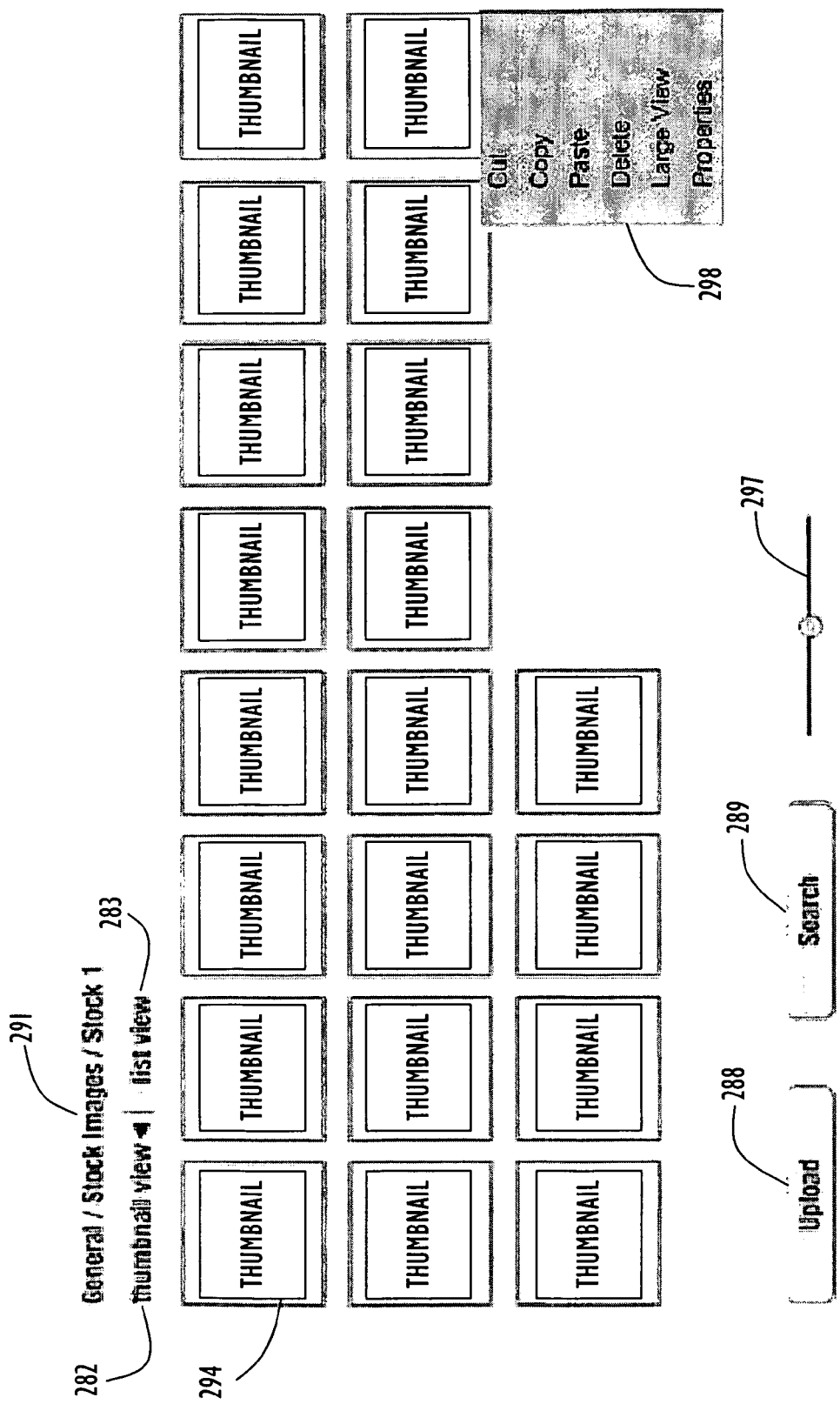
FIG. 14 is a schematic illustration of an exemplary graphical user screen displaying the various creative assets of a selected folder in the form of thumbnail images.

An exemplary graphical user screen employed by file thumbnail view module 222 is illustrated in FIG. 14. Specifically, file list screen 291 includes a list of files of a selected folder with each file rendered in a thumbnail format 294. Double-clicking on a listed file or row provides a large view of that file as described below. Screen 291 further includes thumbnail view icon 282, list view icon 283, upload button 288, search button 289 and a zoom slider 297. Thumbnail and list view buttons 282, 283 enable a user to toggle between file list and thumbnail views (e.g., FIGS. 13 and 14) as described above. Actuation of the upload button 288 uploads a file from an end user system to the selected folder, while actuation of search button 289 enables a user to search for specific files as described above. Zoom slider 297 enables the user to dynamically resize thumbnails (e.g., zoom in/zoom out). In addition, a user may perform various operations from a right-click context menu 298 to manage a file within the context of the system. The menu includes the operations described above (e.g., cut, paste, copy, delete, etc.) and supports group select operations to enable users to perform simultaneous operations on plural files.

Figure 15:
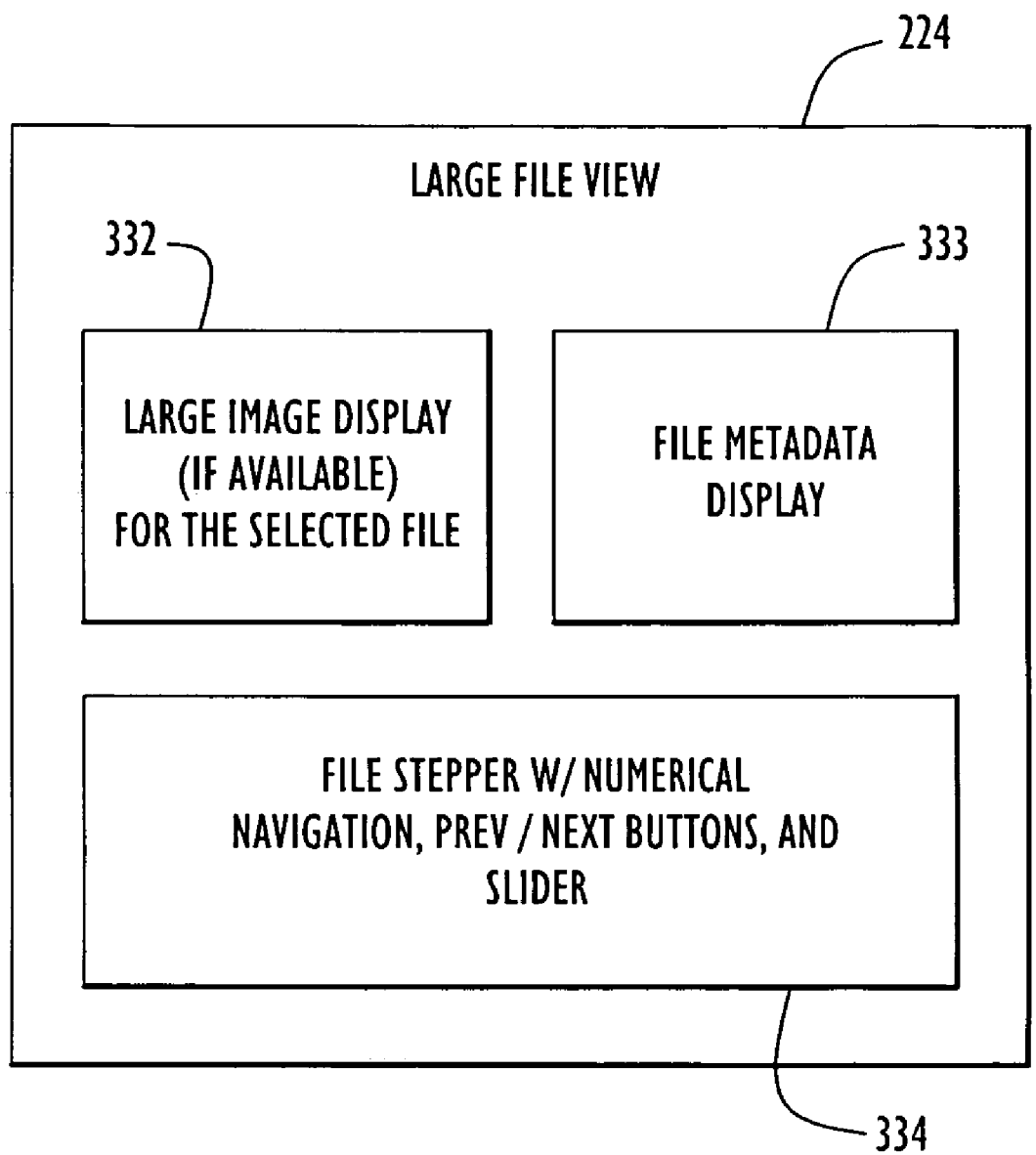
FIG. 15 is a block diagram of the software architecture for displaying selected creative assets or works according to the present invention.

Large file view module 224 of virtual folder view module 104 (FIG. 11) is illustrated in FIG. 15. In particular, large file view module 224 includes a large image display module 332, a file metadata display module 333 and a file stepper module 334. Large image display module 332 displays a selected file as described below, while file metadata display module 333 displays the metadata or properties of the displayed file as described below. File stepper module 334 enables sequential files to be viewed as described below. Modules 332, 333 and 334 are tightly integrated and preferably utilize the same workspace.

Figure 16:
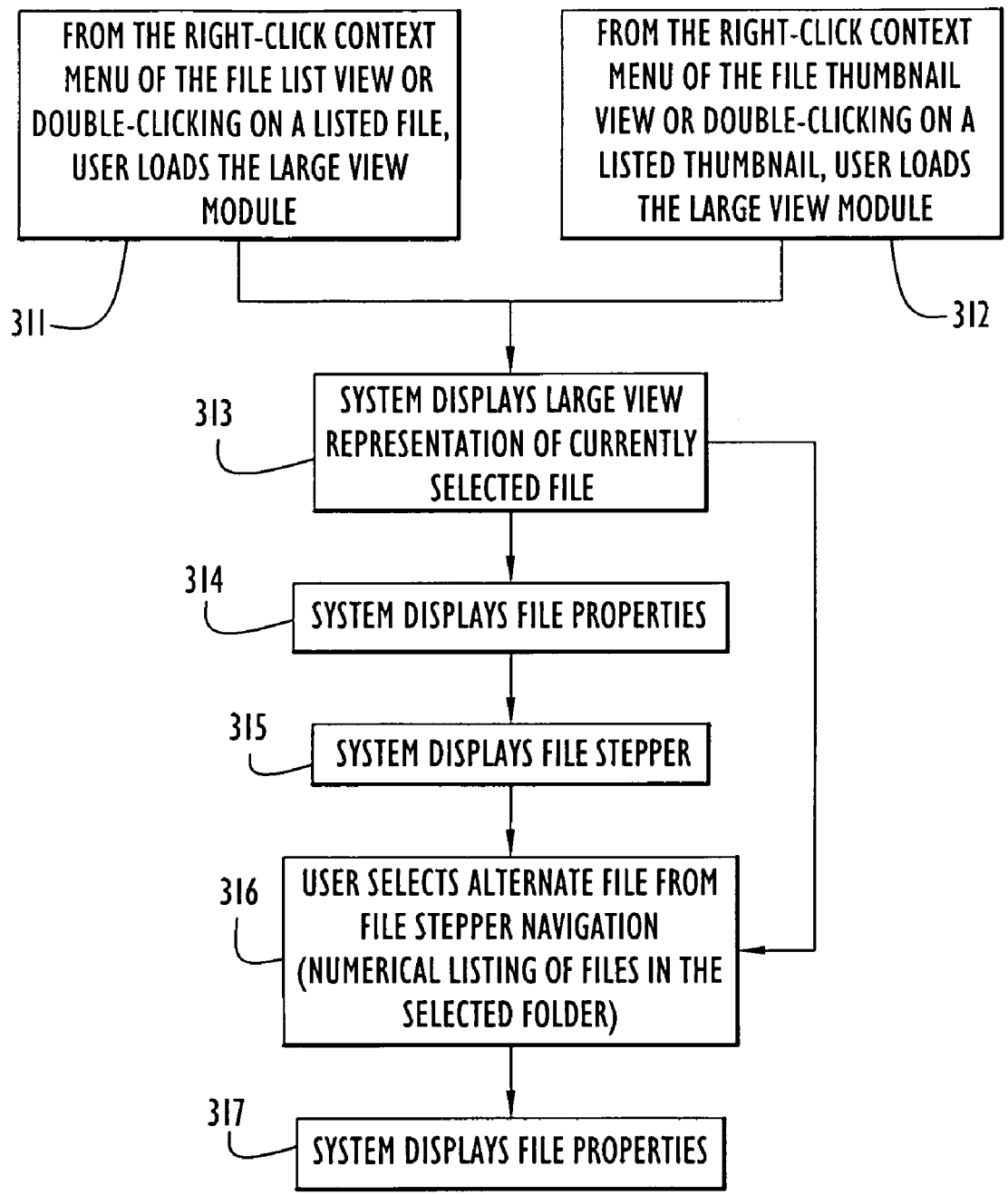
FIG. 16 is a procedural flow chart illustrating the manner in which the virtual asset management system enables display of selected creative assets or works according to the present invention.

The manner in which large file view module 224 (FIG. 15) displays selected files is illustrated in FIG. 16. The large file view interface (FIG. 17) is loaded when a user selects a file from either a file list view (FIG. 13) at step 311, or from a thumbnail view (FIG. 14) at step 312 as described above and initiates the viewing operation (e.g., double clicking the selected file, context menu, etc.). When a large file view interface is initially loaded, the system concurrently displays a large view representation of the currently selected file at step 313. The system further displays the properties or metadata (e.g., name, file type, file size, last modified, modified by, etc.) associated with that file at step 314 and a file stepper at step 315. A user may further navigate to other files in the same folder via the file stepper at step 316. The files in a folder are basically associated with a numerical reference, where the file stepper may be utilized to display a preceding or succeeding file as described below. Once a new file is selected, the system displays the associated properties at step 317 in substantially the same manner described above.

Figure 17:
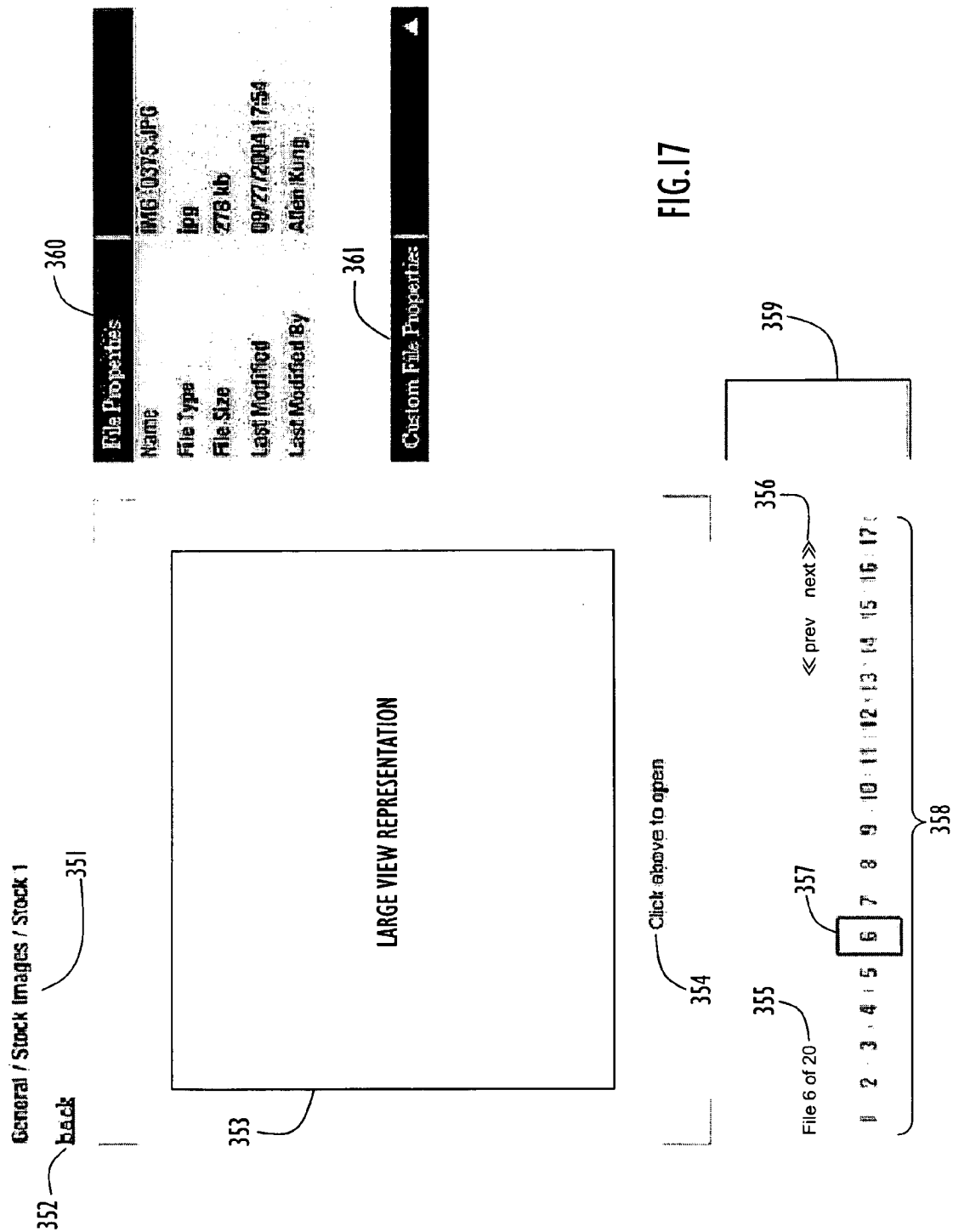
FIG. 17 is a schematic illustration of an exemplary graphical user screen for displaying a selected creative asset or work.

An exemplary graphical user screen employed by large file view module 224 is illustrated in FIG. 17. Specifically, screen 351 includes a file area 362, file property tables 360, 361 and a file stepper 359. A large view representation 353 of the selected file is rendered within file area 362, while file properties and metadata (e.g., name, file type, file size, last modified, modified by, etc.) are displayed in property tables 360, 361. An ordinal position 355 of the current selected file within a folder is indicated by the file stepper. Double-clicking on a large view representation 353 of a file, or clicking on an icon 354 (e.g., "Click above to open") loads the contents of the selected file into an external interface.

File Stepper 359 enables a user to stay within large file view interface 351 and navigate to other files in the same folder. The file stepper includes a numerical navigator 358, a slider 357 and previous/next icons 356. Numerical navigator 358 includes a series of numerical values each associated with a corresponding file within the folder. A user drags slider 357 to a desired numerical value representing an ordinal position of a file in the selected folder (e.g., with respect to other files in that folder). The user may further click directly on a numerical value in numerical navigator 358, or may actuate the previous/next icons to change the position of slider 357. When the position of the slider changes to indicate a new file, a large view representation 353 of the newly selected file is displayed with the corresponding file properties and metadata.

Figure 18:
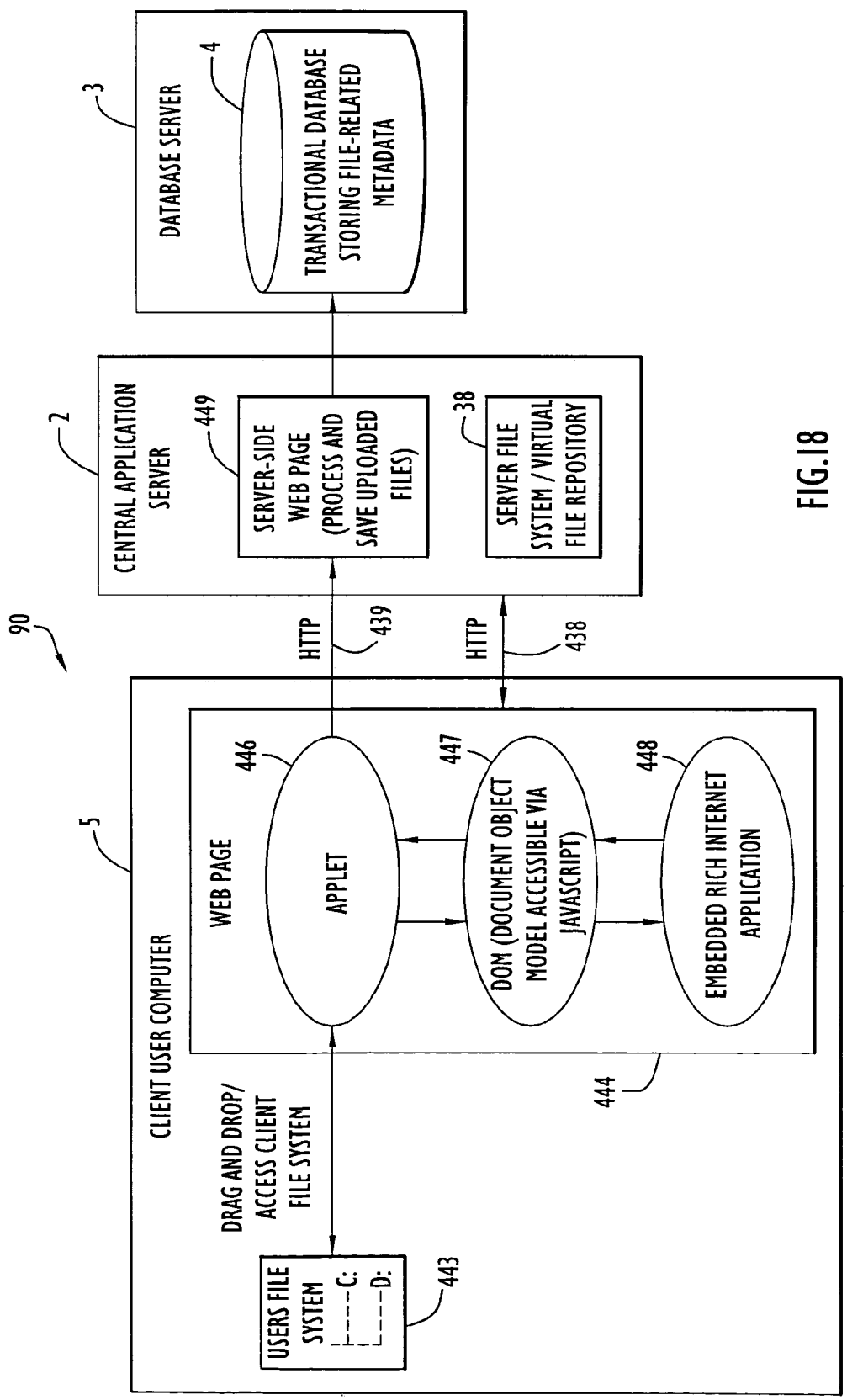
FIG. 18 is a block diagram of the software architecture for uploading creative assets or works from an end user system according to the present invention.

Rich Client upload module 103 of virtual file system manager 101 (FIG. 5) is illustrated in FIG. 18. Initially, system 90 includes client computer system 5, central application server 2, database server 3 and transactional database 4, each as described above. The Rich Client upload module provides a user interface that takes advantage of the capabilities of a Rich Client interface to enable the user to upload plural assets to the virtual file system in an expedited manner. Rich Client upload module 103 includes various modules 446-449 residing on client or end-user system 5 and central application server 2. A client user, via an Internet Connection (HTTP) 438, 439, loads a Web page 444 from central application server 2. Web page 444 includes an embedded Javascript application 447, a Java Applet 446, and a Rich Internet Application (RIA) (e.g., a Flash application) 448. Java Applet 446 and Rich Internet Application 448 serve as the interfaces for the Web page.

A user may select files to be uploaded from a local file system 443 of computer system 5 to virtual file system 38 on central application server 2. Initially, Java Applet 446 may access the local file system and send metadata relating to files that have been placed to a Document Object Model of the user browser in response to user acceptance of a security certificate. Rich Internet Application 448 does not have permission to directly access the local file system. In order overcome this circumstance, the browser Document Object Model essentially serves as an intermediary agent between Rich Internet Application 448 and Java Applet 446 to enable the Rich Internet Application to gain access to and process the files. In particular, a user may drag one or more selected files from local file system 443 into Java Applet 446. The Java Applet alerts Rich Internet Application 448, via Javascript application 447, that one or more files have been dropped into the Java Applet. Rich Internet Application 448 subsequently reads the file metadata written to the Document Object Model by Java Applet 446 and updates an upload queue accordingly.

Alternatively, a single visual interface may be provided for the user to browse and select plural files from local file system 443 to be uploaded to virtual file system 38. The visual interface is handled (e.g., from a user perspective) by Rich Internet Application 448. The Rich Internet Application enables the user to traverse local file system 443 and select one or more files to be included in the upload queue.

Java Applet 446 is hidden from the user and is responsible for reading metadata from the user file system and sending that data to the browser Document Object Model. Rich Internet Application 448 subsequently reads the file metadata written to the Document Object Model by Java Applet 446 and updates the upload queue accordingly.

Users can select files from the upload queue for uploading to virtual file system 38 on central application server 2. Uploaded files are processed by a server-side Web page 449 (e.g., residing on central application server 2) and physically stored in virtual file system 38. Thumbnail and large view representations of each uploaded file are further stored in the virtual file system. Transactional database 4 stores relevant metadata (e.g. "Date Modified", "File Name", "Size", etc.) associated with each uploaded file. The processing of uploaded files on central application server 2 may be implemented on various platforms (e.g. J2EE, Net, etc.).

Figure 19:
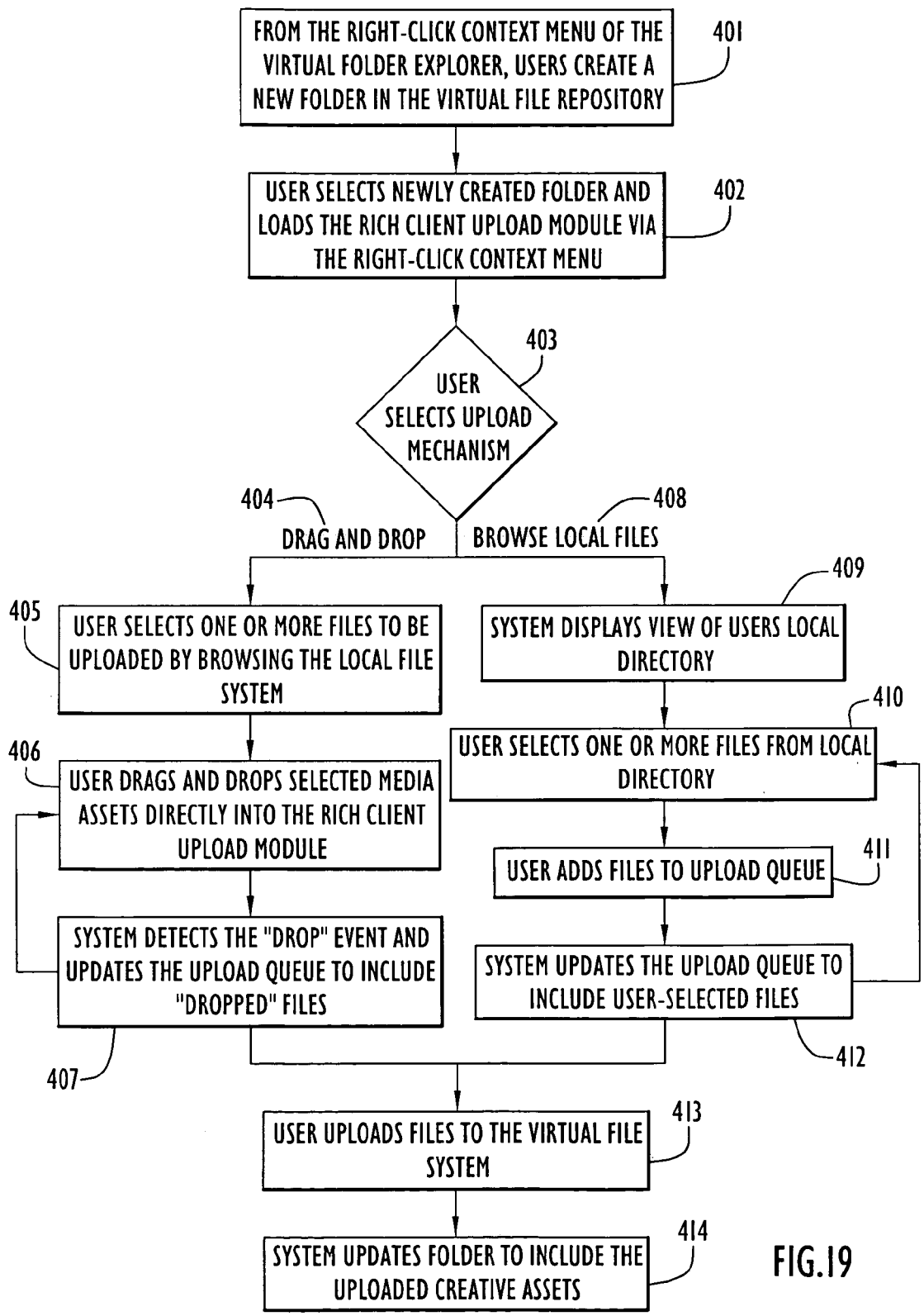
FIG. 19 is a procedural flow chart illustrating the manner in which the virtual asset management system uploads creative assets or works from an end user system according to the present invention.

The manner in which Rich Client upload module 103 uploads files is illustrated in FIG. 19. The Rich Client upload interface (FIGS. 20-21) is initiated from the virtual folder explorer (e.g., step 183 of FIG. 9) via a folder right-click context menu at steps 401 and 402. In particular, a new folder is created in the virtual folder explorer via a context menu operation (e.g., new folder operation) at step 401 and the user selects the new folder and initiates the upload via a context menu operation (e.g., upload files) at step 402. The user may select an upload mechanism (e.g., drag and drop operation 404 or browse local files operation 408) from the upload interface at step 403. When the drag and drop upload operation is selected, a user selects one or more files to be uploaded from the user local file system at step 405. Once the files are selected, the user drags and drops or places files to be uploaded directly into a drop area of the Rich Client upload interface at step 406 (e.g., FIG. 20). The system subsequently updates the upload queue of the Rich Client upload interface at step 407 to include the placed files. Steps 406 and 407 may be repeated to place additional files in the upload queue.

When the browse local file operation is selected at step 403, the system displays a visual representation of the user local file system (FIG. 21) at step 409. The user subsequently selects one or more files (e.g., a group selection may be utilized to select plural files) from this interface at step 410 and adds the selected files to the upload queue at step 411. The system updates the upload queue to include the selected files at step 412. Steps 410-412 may be repeated to place additional files in the upload queue.

Once one or more files have been added to the upload queue via the drag and drop or browse local files operations, a user may upload files into the virtual file system at step 413. The system subsequently updates the designated folder to include the uploaded creative assets at step 414.

Figure 20:
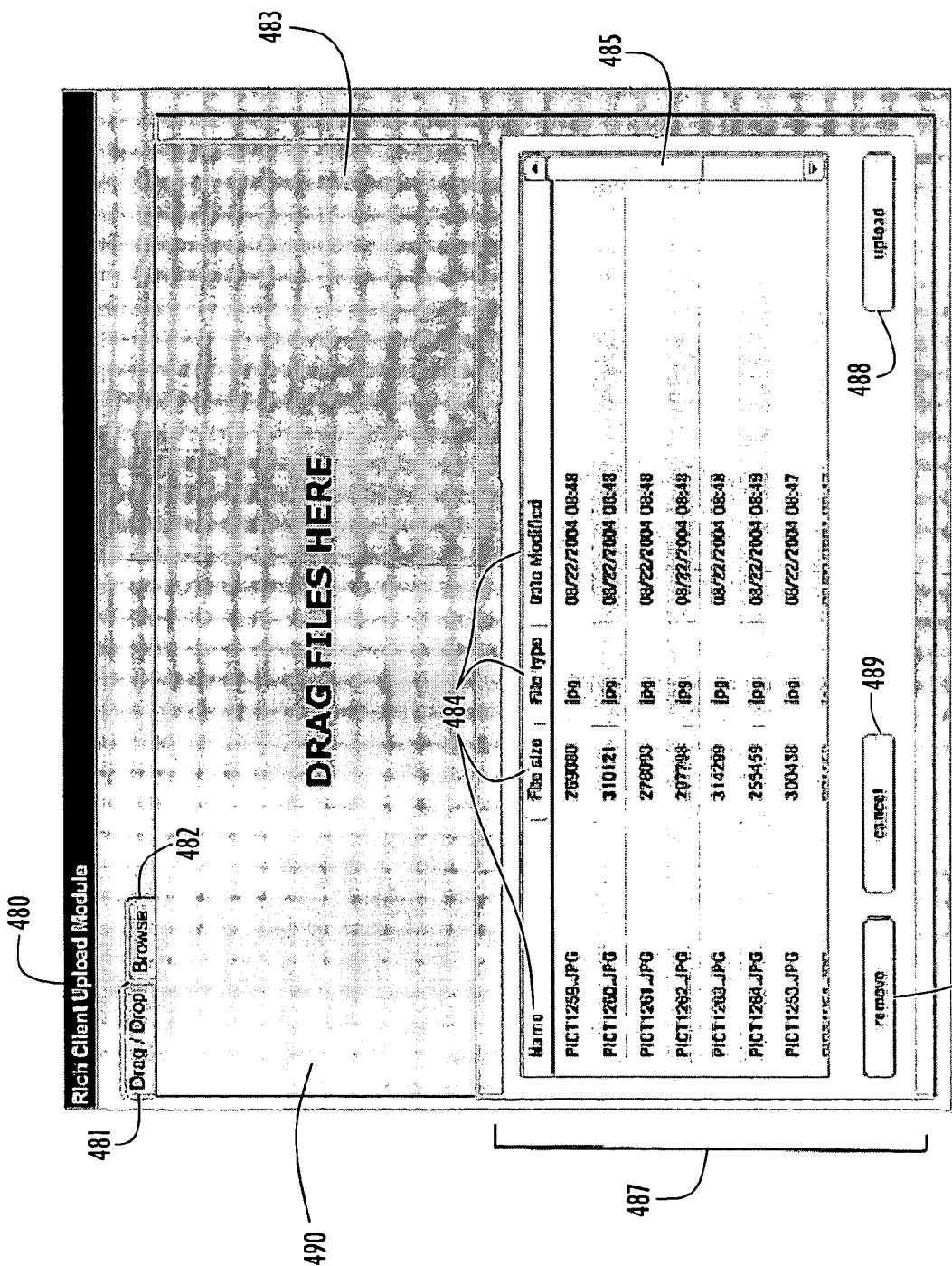
FIG. 20 is a schematic illustration of an exemplary graphical user screen for uploading a creative asset or work from an end user system via a drag and drop operation.
Figure 21:
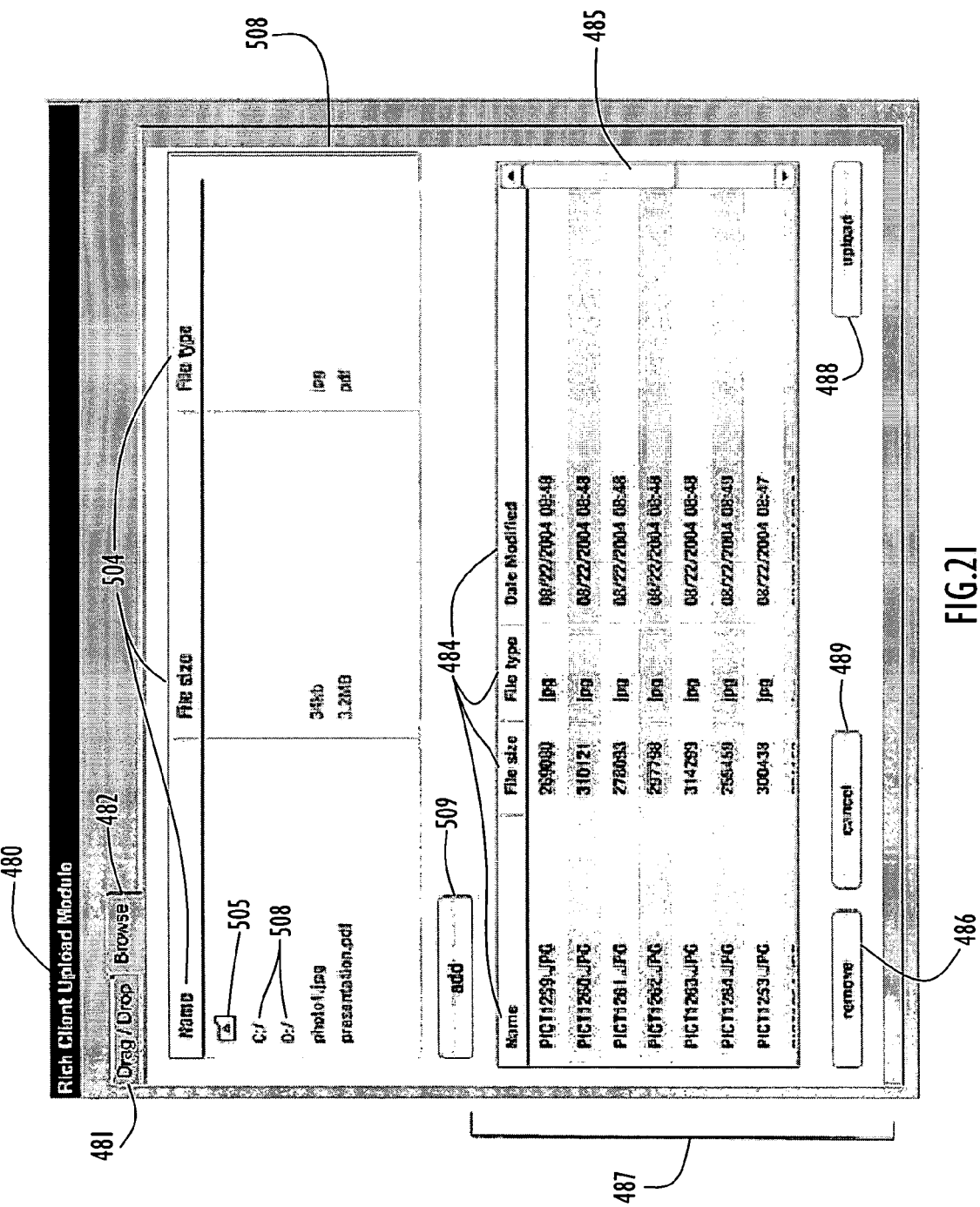
FIG. 21 is a schematic illustration of an exemplary graphical user screen for uploading a creative asset or work from an end user system via selection from a directory listing.

Exemplary graphical user screens employed by the Rich Client upload module are illustrated in FIGS. 20-21. In particular, the user screen for Rich Client upload module 103 includes a "tabbed" user interface (FIG. 20) with a drag/drop tab 481 and a browse tab 482. The user may navigate between the drag/drop interface (FIG. 20) and the browse interface (FIG. 21) via actuation of tabs 481, 482.

The upload screen with the drag/drop tab selected is illustrated in FIG. 20. Specifically, drag/drop interface 490 includes a drop area 483 and an upload queue 487. The user drags and drops or places files to be uploaded in drop area 483 (e.g., including exemplary instructional text "DRAG FILES HERE" as viewed in FIG. 20). By way of example only, the drop area 483 is a rectangular area. However, the drop area may be of any type, shape or size (e.g. circles, graphical images, etc.). Once the files are placed into drop area 483, upload queue 487 is updated to include metadata (e.g., "Name", "File Size", "File Type", "Date Modified", etc.) reflecting the dropped or placed files. Upload queue 487 is generally in the form of a table and includes column headers 484 (e.g., name, file size, file type and date modified). Clicking on or actuating each column header 484 sorts upload queue 487 according to the selected attribute. Further, upload queue 487 includes a scroll bar 485 to enable a user to scroll through the upload queue.

In addition, drag/drop interface 490 includes a remove button 486, an upload button 488 and a cancel button 489. Items may be removed from upload queue 487 by selecting one or more files and actuating remove button 486. Actuating or clicking on upload button 488 initiates the upload process to upload files from upload queue 487 to virtual file system 38. Cancel button 489 enables a user to cancel an operation.

The upload screen with the browse tab selected is illustrated in FIG. 21. Specifically, browse interface 501 includes directory browser 506 and upload queue 487. The user traverses a local file system directory within directory browser 506 to select files to be added to upload queue 487. Directory browser 506 displays a listing of files residing in a directory. The user may navigate to another directory in the local file system by either clicking on a back icon 505 to view the contents of a parent directory, or by clicking on a directory 508 within the listing to refresh the view. The listing is in the form of a table with columns including metadata (e.g., name, file size and file type) associated with local files residing on an end user computer system. Clicking on or actuating each header 504 of a column (e.g., "Name", "File size" and "File type") sorts the listing according to the selected attribute. Similarly, clicking on or actuating column headers 484 of upload queue 487 sorts the upload queue according to the selected attribute as described above. Further, upload queue 487 includes scroll bar 485 to enable a user to scroll through the upload queue as described above.

In addition, browse interface 501 includes remove button 486, upload button 488, cancel button 489 and an add button 509. Items may be removed from upload queue 487 by selecting one or more files and actuating remove button 486, while addition of items to the upload queue may be accomplished by selecting one or more files and actuating add button 509. Actuating or clicking on upload button 488 initiates the upload process to upload files from upload queue 487 to virtual file system 38. Cancel button 489 enables a user to cancel an operation.

Figure 22:
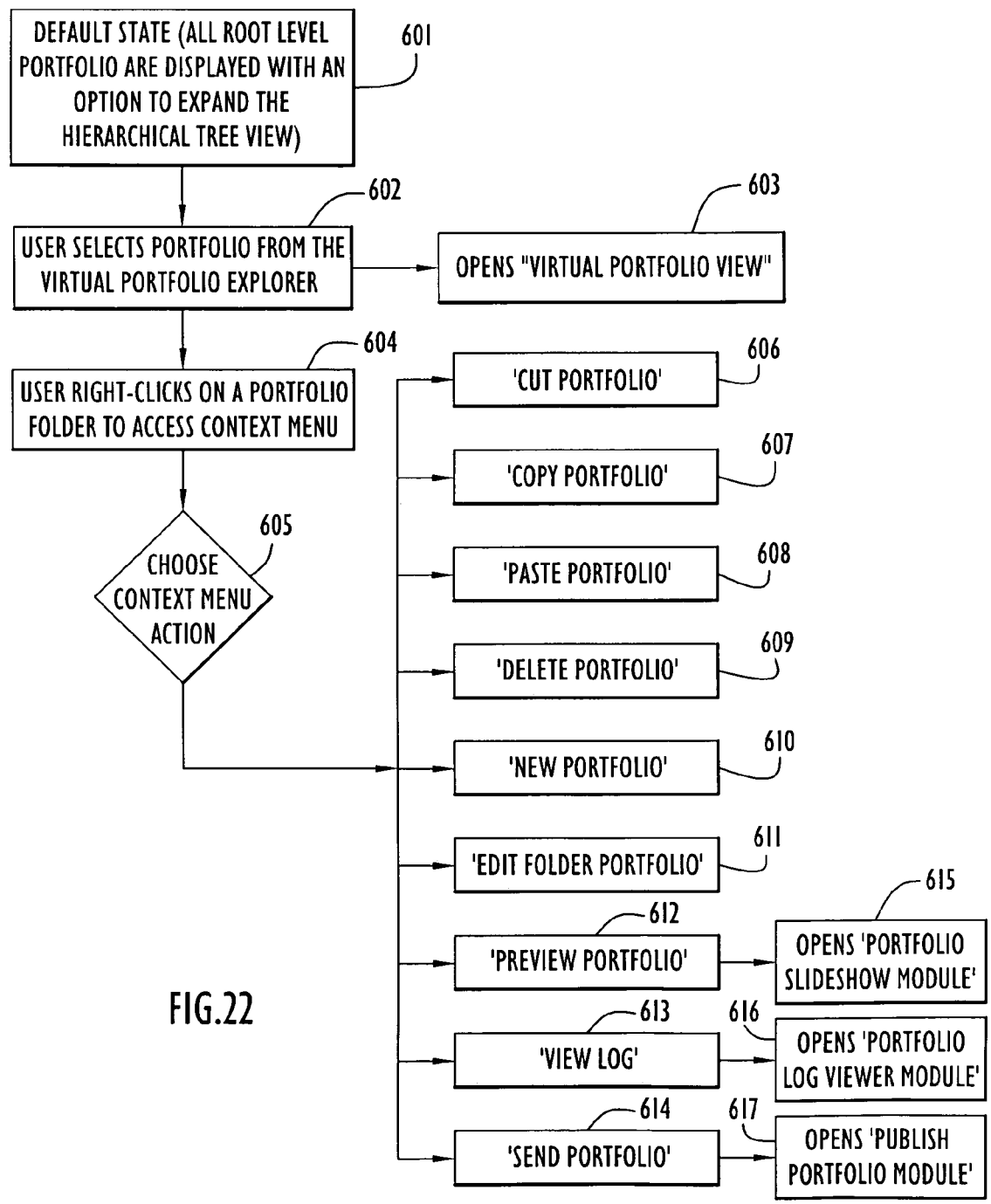
FIG. 22 is a procedural flow chart illustrating the manner in which the virtual asset management system enables management of portfolios by users according to the present invention.

The manner in which virtual portfolio explorer module 107 (FIG. 5) manages portfolios is illustrated in FIG. 22. The virtual portfolio explorer serves as an interface for virtual portfolio manager 106 and enables users to organize and manage a hierarchical tree structure of nested portfolios. A portfolio generally refers to a customized view of creative assets within the virtual file system and may be published to other users via a password-protected Extranet or the Internet as described below. In particular, the virtual portfolio explorer initially resides in a default state and displays root-level portfolios within the system previously created by other users at step 601. A user may select a portfolio at step 602, where the system opens a view of the selected portfolio at step 603 as described below. The user may further right-click on a portfolio via a mouse to display a context menu of portfolio operations at step 604. These operations may be selected at step 605 and are performed by leveraging the capabilities of a Rich Internet Application (RIA) (e.g., a Flash application). The operations include cut portfolio (e.g., removes a portfolio, step 606), copy portfolio (e.g., provides a copy of a portfolio for placement at another location, step 607), paste portfolio (e.g., inserts cut portfolios, step 608), delete portfolio (e.g., removes a portfolio, step 609), new portfolio (e.g., creates a new portfolio, step 610), edit folder portfolio (e.g., enables modification of portfolio characteristics, step 611), preview portfolio (e.g., enables users to preview a portfolio prior to publishing, step 612), view log (e.g., enables users to access a portfolio log history, step 613) and send portfolio (e.g., enables users to publish portfolios viewable over a password-protected Extranet or the Internet, step 614). Users may preview a portfolio at step 612 by utilizing portfolio slideshow module 111 at step 615 as described below, and may further view a portfolio log history at step 613 by utilizing portfolio log viewer module 110 at step 616 as described above. In addition, users may send a portfolio at step 614 by utilizing publish portfolio module 109 at step 617 as described below.

Figure 23:
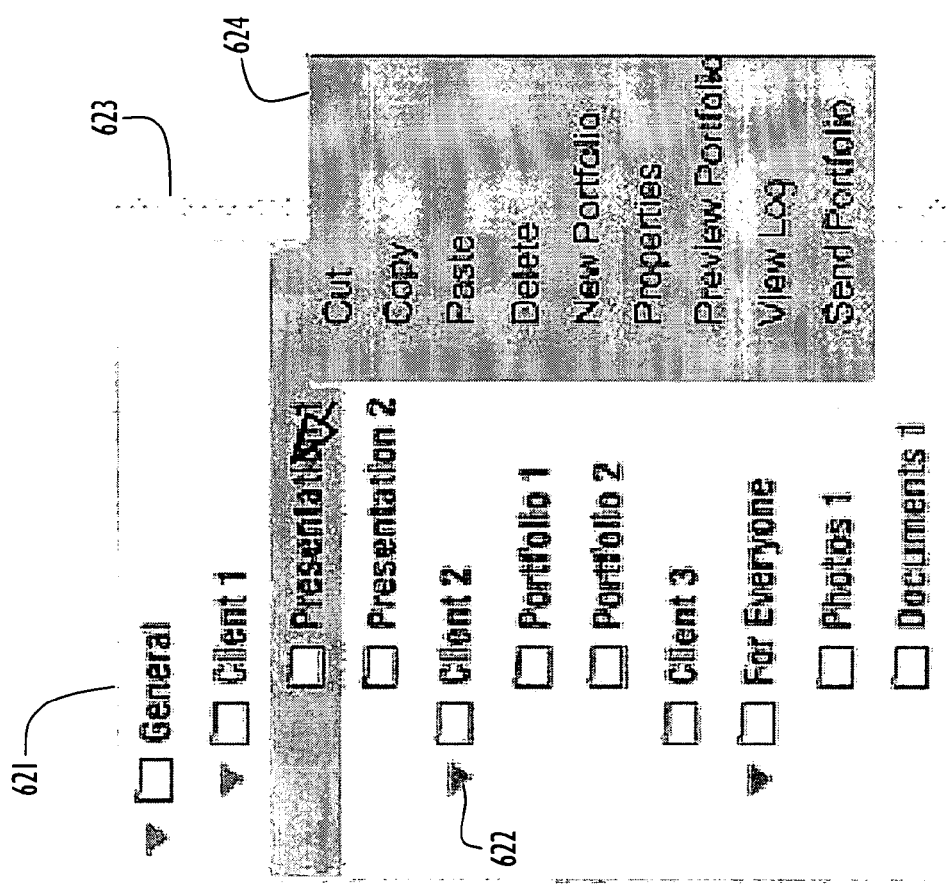
FIG. 23 is a schematic illustration of an exemplary graphical user screen for displaying and managing portfolios within the virtual asset management system.

An exemplary graphical user screen utilized by the virtual portfolio explorer is illustrated in FIG. 23. Specifically, screen 621 includes a window 623 including a hierarchical tree structure 622 of portfolios within the virtual file system. Users may expand and contract portfolios within tree structure 622 to display and/or hide sub-portfolios. A user may select portfolios from the tree structure directory and perform various operations to manage the portfolios via context menu 624 as described above. In addition, users may click and drag boundaries of window 623 to expand the horizontal viewing area. The virtual portfolio explorer leverages the capabilities of a Rich Internet Application (RIA) (e.g., Flash application) to enable a user to interact with the remote portfolios or virtual portfolio system as if that system resided on the end user desktop.

Figure 24:
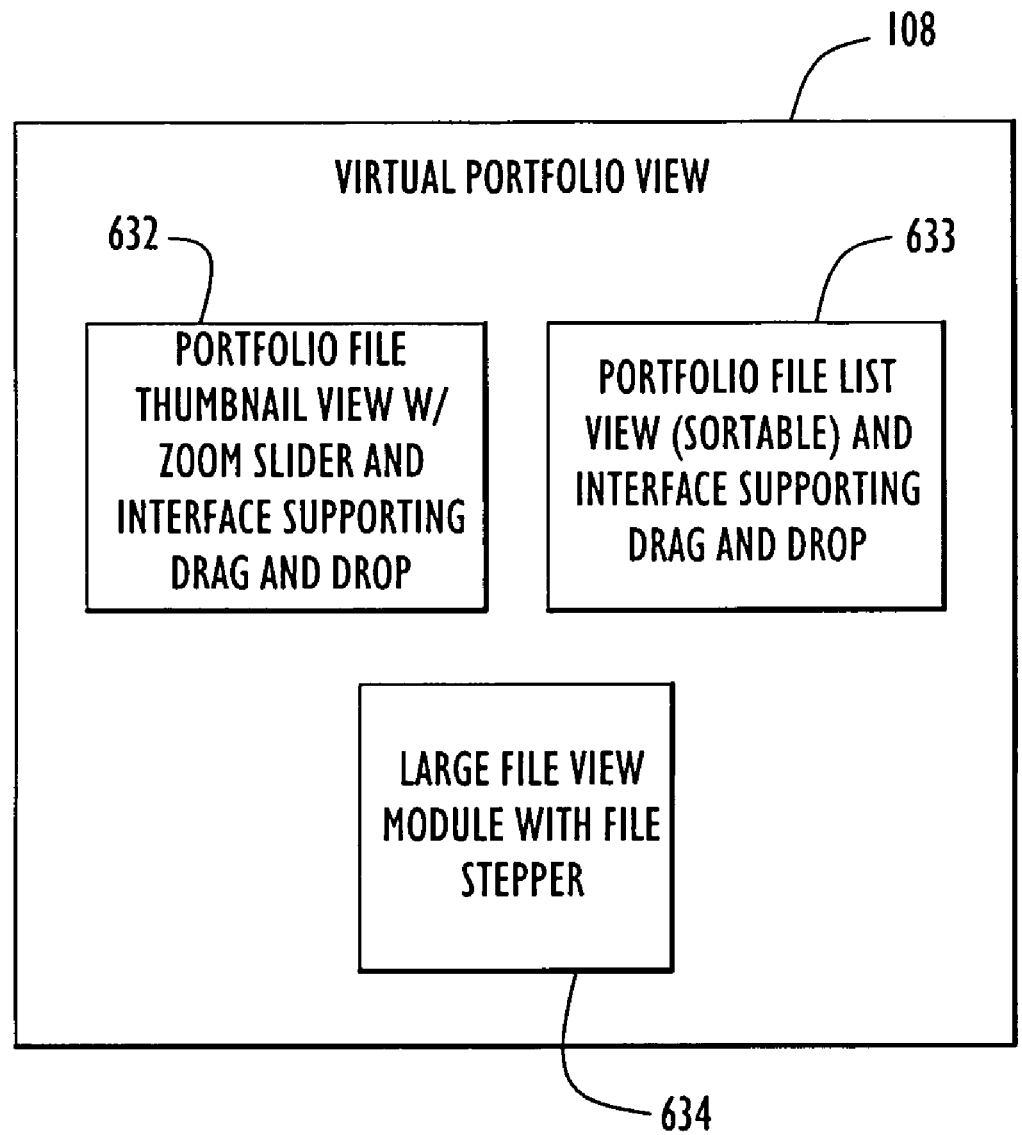
FIG. 24 is a block diagram of the software architecture for viewing portfolios according to the present invention.

Virtual portfolio view module 108 of virtual portfolio manager 106 (FIG. 5) is illustrated in FIG. 24. In particular, virtual portfolio view module 108 includes a portfolio file thumbnail view module 632, a portfolio file list view module 633, and a large file view module 634. Portfolio file thumbnail view module 632 displays thumbnail representations of the portfolio files in a selected portfolio as described below, while portfolio file list view module 633 displays a sortable, list view representation of the files in a selected portfolio as described below. Portfolios can be populated by dragging and dropping files from the virtual folder view of the virtual file system manager into the portfolio file thumbnail view or the portfolio file list view as described below. Large file view module 634 displays a large view representation of a single portfolio file in substantially the same manner as large file view module 224 described above. Modules 632, 633 and 634 are tightly integrated, preferably utilize the same workspace and leverage the capabilities of a Rich Internet Application (RIA) (e.g., a Flash application) to support drag and drop operations and right-click context menus as described below.

Figure 25:
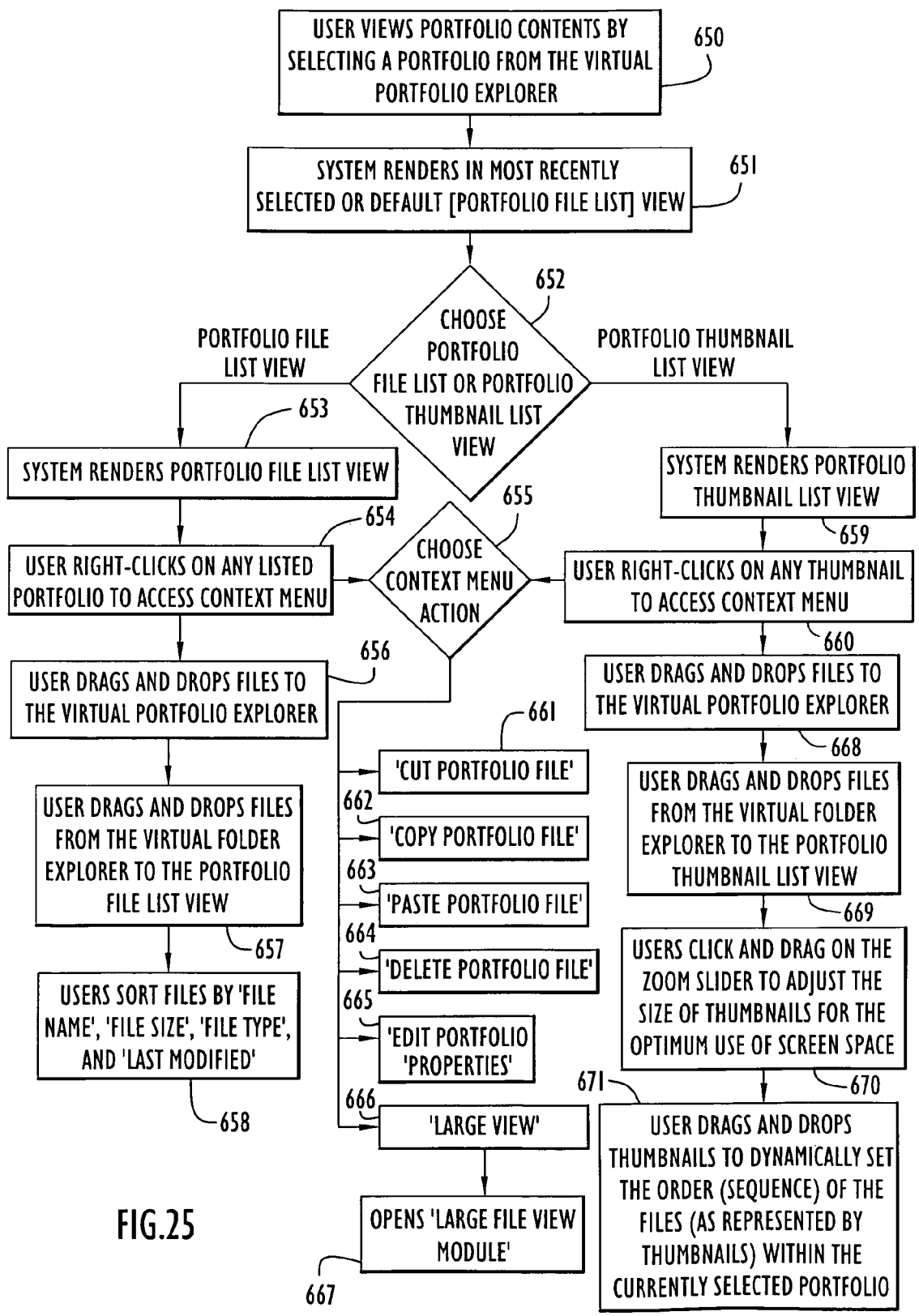
FIG. 25 is a procedural flow chart illustrating the manner in which the virtual asset management system displays and manages portfolios according to the present invention.

The manner in which virtual portfolio view module 632 (FIG. 24) manages portfolios is illustrated in FIG. 25. Initially, the virtual folder view interface is loaded when a user selects a portfolio from the virtual portfolio explorer (e.g., step 603 of FIG. 22) at step 650. This interface is substantially similar to the interface for the virtual folder view (FIGS. 13-14) described above and provides files with respect to portfolios. The virtual portfolio view module resides in a default state and renders a portfolio file list view at step 651 that is substantially similar to the file list view described above for FIG. 13. This view includes a sortable list of files contained in a selected portfolio and is maintained at step 653 in response to selection of this type of view by a user at step 652. The user may perform a drag and drop operation at step 656 in order to move or copy files from the portfolio file list view to a desired portfolio. The user may further perform a drag and drop operation at step 657 in order to move or copy files from the virtual folder explorer to the portfolio file list view. Plural files may be selected for transfer using a group select operation. Files may further be sorted by a file attribute (e.g. "File Name", "File Size", "File Type", "Last Modified", etc.) at step 658.

Alternatively, the user may right-click on a portfolio via a mouse to display a context menu of portfolio operations at steps 654, 655. The portfolio operations (e.g., cut, paste, copy, delete) support group selection, thereby enabling users to perform simultaneous operation on plural files. The context menu operations are performed by leveraging the capabilities of a Rich Internet Application (RIA) (e.g., Flash application) and include cut portfolio file (e.g., removes a portfolio file, step 661), copy portfolio file (e.g., provides a copy of a portfolio file for placement at another location, step 662), paste portfolio file (e.g., inserts cut portfolio files, step 663), delete portfolio file (e.g., removes a portfolio file, step 664), edit portfolio properties (e.g., enables modification of portfolio characteristics, step 665) and large view (e.g. enables viewing of a portfolio file, step 666). Users can load a large view representation of a single file in the selected portfolio view at step 666 by utilizing large file view module 634 at step 667 as described above.

When a user switches from the portfolio file list view to a portfolio file thumbnail view at step 652, a portfolio file thumbnail view is displayed at step 659 that is substantially similar to the file thumbnail view described above for FIG. 14. This view includes a thumbnail representation of files contained in a selected portfolio. The user may perform a drag and drop operation at step 668 in order to move or copy files from the portfolio file thumbnail view to a desired portfolio. Further, the user may perform a drag and drop operation at step 669 in order to move or copy files from the virtual folder explorer to the portfolio file thumbnail view. Plural files may be selected for transfer using a group select operation. The user may further click and drag on a zoom slider to dynamically adjust the size of the thumbnails at step 670. In addition, the user may perform drag and drop operations within a portfolio at step 671 to dynamically set the order (e.g., sequence) of the portfolio files (e.g., as represented by thumbnails) within the currently selected portfolio. Alternatively, the user may right-click on a portfolio via a mouse to display a context menu of portfolio operations at steps 655, 660. The operations (e.g., cut, paste, copy, delete) support group selection, thereby enabling users to perform simultaneous operation on plural files as described above. The context menu operations are performed by leveraging the capabilities of a Rich Internet Application (RIA) (e.g., Flash application) and include the operations described above for the portfolio file list view.

Figure 26:
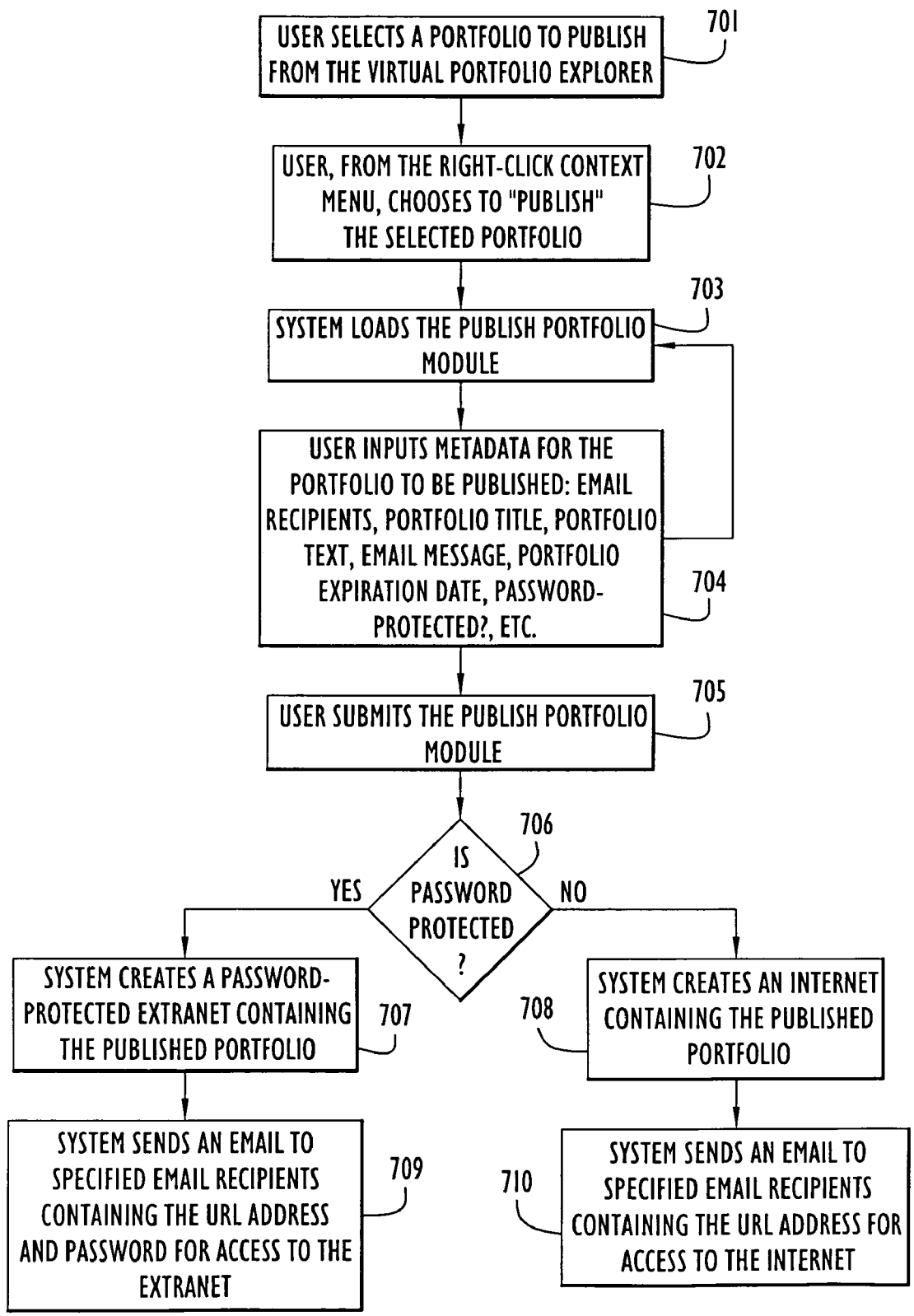
FIG. 26 is a procedural flow chart illustrating the manner in which the virtual asset management system publishes portfolios according to the present invention.

The manner in which publish portfolio module 109 of virtual portfolio manager 106 (FIG. 5) publishes portfolios is illustrated in FIG. 26. Initially, a user selects a portfolio to publish from the virtual portfolio explorer at step 701 as described above. In response to selection of a publish operation from a context menu (e.g., step 617 of FIG. 22) at step 702, the system loads publish portfolio module 109 and displays a publish portfolio interface (FIG. 27) at step 703. In particular, a user enters metadata (e.g., electronic mail recipients, portfolio title, portfolio text, electronic mail message, portfolio expiration date, password protection indication, etc.) for the portfolio to be published at step 704. Steps 703 and 704 may be repeated for additional portfolios.

Once a portfolio is submitted for publication at step 705, the system publishes the portfolio depending upon the password protection. If the portfolio is password protected as determined at step 706, the system creates a password protected Extranet including the portfolio at step 707 and dynamically generates and sends an electronic mail message to the specified recipients containing the URL address and password for access to the Extranet and published portfolio at step 709. When the portfolio is not password protected as determined at step 706, the system creates an Internet including the portfolio at step 708 and dynamically generates and sends an electronic mail message to the specified recipients containing the URL address for access to the Internet and published portfolio at step 710.

Figure 27:
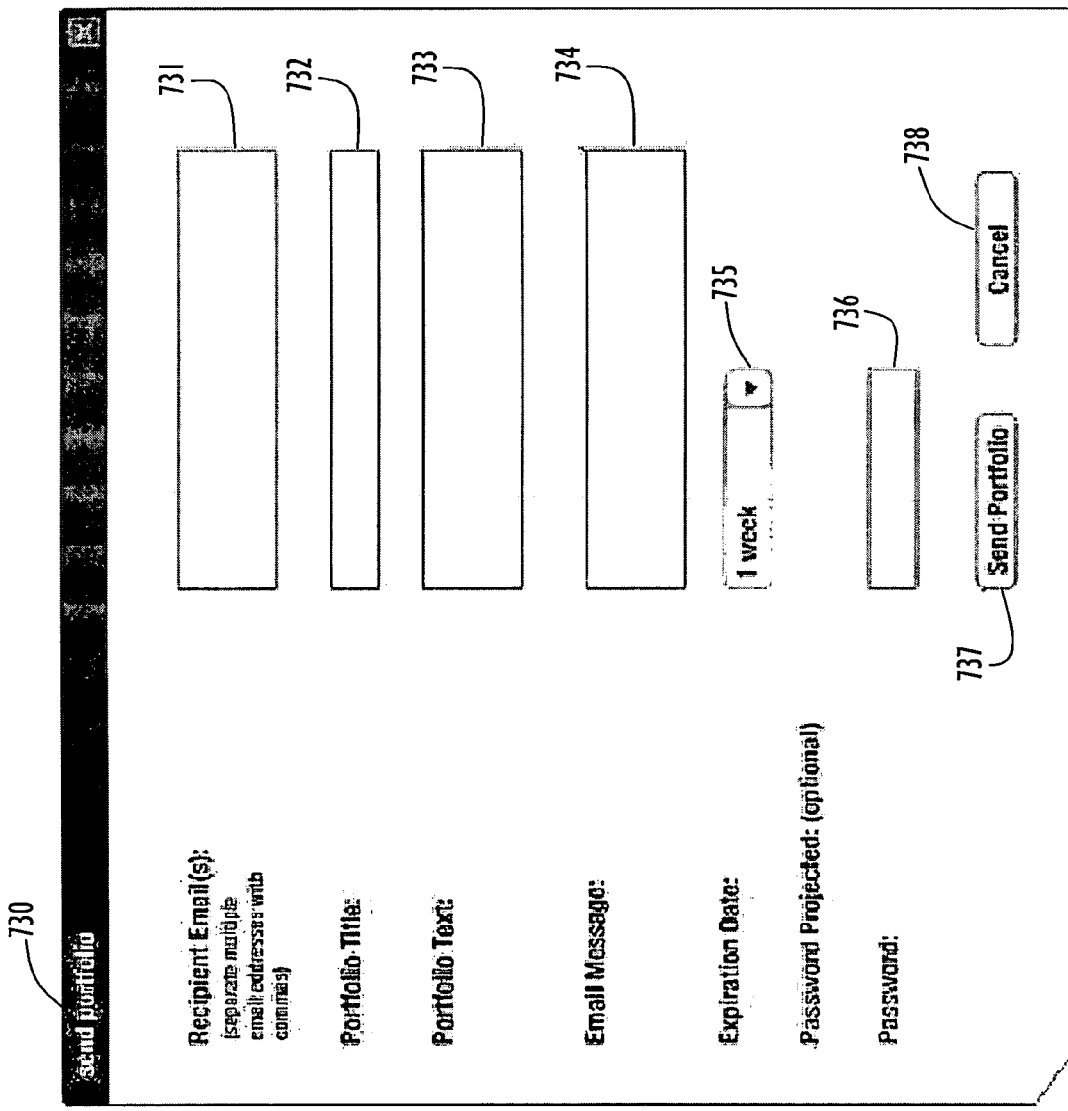
FIG. 27 is a schematic illustration of an exemplary graphical user screen for publishing portfolios within the virtual asset management system.

An exemplary graphical user screen employed by publish portfolio module 109 is illustrated in FIG. 27. In particular, screen 730 is represented as a form and includes a plurality of data fields 731-736, a send portfolio button 737 and a cancel button 738. The user enters data in the displayed fields as appropriate for the selected portfolio (e.g., electronic mail recipients in field 731, a portfolio tile in field 732, portfolio text in field 733, electronic mail message in field 734, portfolio expiration in field 735 (e.g., preferably in the form of a drop down list with a time interval for expiration (e.g., week, month, day, etc.), and a password in field 736) and actuates send portfolio button 737 to initiate publication of the portfolio. Cancel button 738 may be utilized to cancel an operation.

Once the user sends a portfolio, the system generates an automated electronic mail message to one or more recipients indicated in field 731. The message includes an HTTP link to the portfolio. An exemplary electronic mail message generated and sent by the system is illustrated in FIG. 28. When the recipient receives the message and clicks on the HTTP link, a portfolio slideshow interface is displayed in the browser window to enable viewing of the published portfolio as described below.

Figure 31:
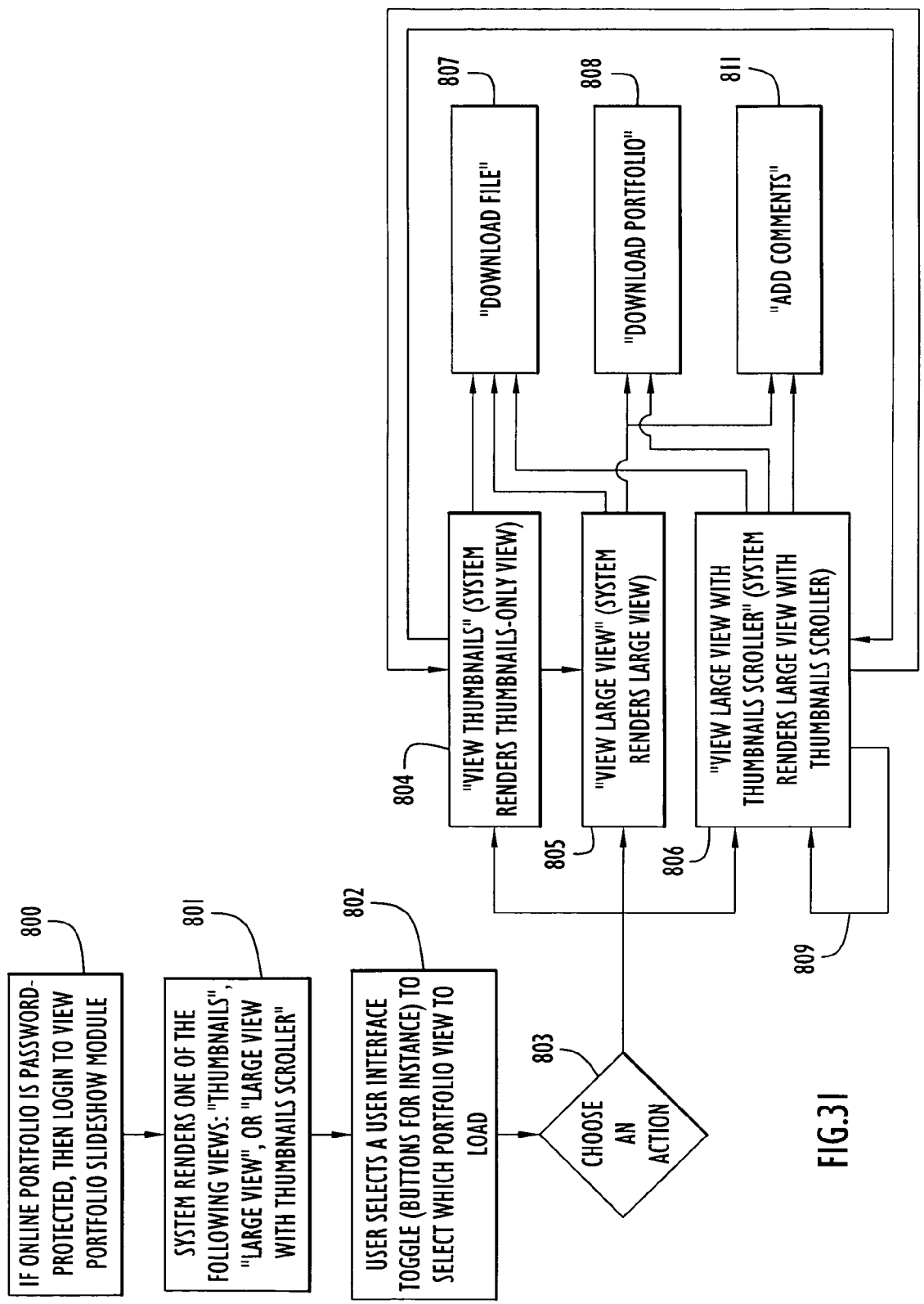
FIG. 31 is a procedural flow chart illustrating the manner in which a portfolio is displayed according to the present invention.

The manner in which portfolio slideshow module 111 (FIG. 5) displays a portfolio is illustrated in FIG. 31. The virtual portfolio slideshow module is initiated when a user invokes a preview portfolio operation (e.g., from a context menu at step 615 of FIG. 22, clicking on the HTTP link to an online portfolio within an electronic mail message (FIG. 28), actuation of a preview portfolio button (FIG. 7), etc.). The preview portfolio operation enables a user to view either an online portfolio received from a user, or a selected portfolio prior to delivery or publication to another user. In particular, the user logs in at step 800 when the portfolio is password-protected. This may be specified by a user during publication as described above (FIG. 27). The system subsequently renders either a thumbnail view, a large view or a large view with a thumbnail scroller at step 801, where the user selects the desired view (e.g., via a toggle switch or icon) at step 802. Once the desired view is selected at step 803, the system renders the appropriate view at steps 804 (e.g., thumbnail view), 805 (e.g., large view) and 806 (e.g., large view with thumbnail scroller).

The thumbnail view interface (e.g., step 804) displays thumbnail representations of the creative assets within the portfolio. Clicking on a thumbnail image may switch to the large view with thumbnail scroller (e.g., step 806). Alternatively, the system may be configured to switch to the large view (e.g., step 805).

The large view interface (e.g., step 805) displays the large view representation of a single creative asset in the portfolio. The large view with thumbnail scroller interface (e.g., step 806) displays both the large view representation of a single creative asset in the portfolio and a thumbnail scroller. The thumbnail scroller is a scrollable panel including the thumbnail representations of the creative assets within the portfolio. This provides the user with an expedited manner to locate a thumbnail and refresh the interface to reflect the large view representation of the newly selected creative asset. Clicking on a thumbnail image may switch to the thumbnail view (e.g., step 804).

A user may download the current selected creative asset at step 807 from the thumbnail, large view and large view with thumbnail scroller interfaces. In addition, the user may download the entire portfolio as a compressed archive of files (e.g., zip file) at step 808, or add comments to the current selected creative asset at step 811 from the large view and large view with thumbnail scroller interfaces.

Figure 32:
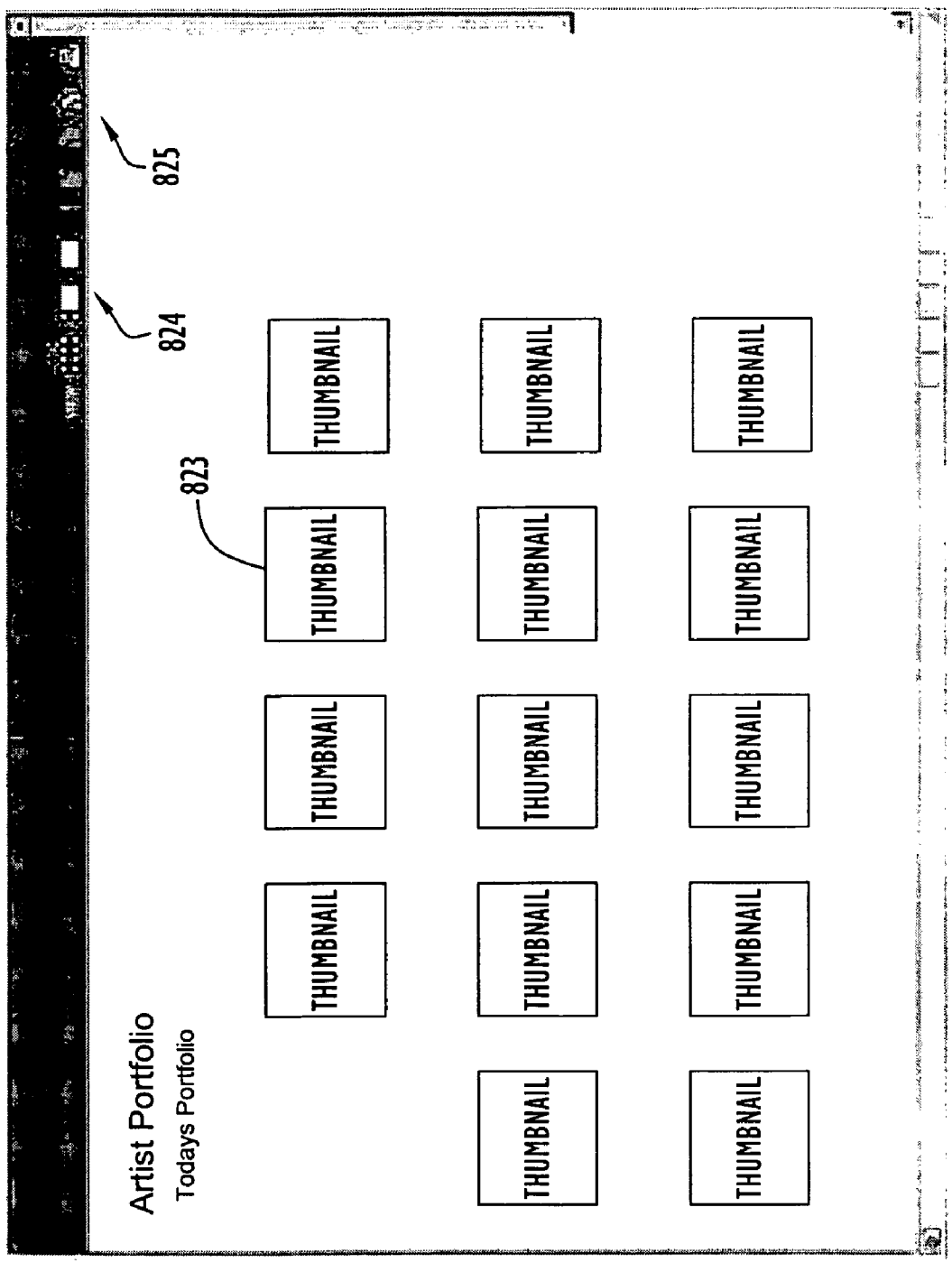
FIG. 32 is a schematic illustration of an exemplary graphical user screen previewing the various creative assets of a desired portfolio in the form of thumbnail images.

An exemplary graphical user screen employed by portfolio slideshow module 111 to provide a thumbnail view is illustrated in FIG. 32. The screen includes the creative assets of the portfolio in the form of thumbnail images 823. A user may click on a thumbnail image to switch to a large view interface (FIG. 33) or a large view with thumbnail scroller interface (FIG. 34) described below. The screen further includes icons 824 enabling the user to toggle between the current and other interfaces (e.g., a large view interface (FIG. 33) or a large view with thumbnail scroller interface (FIG. 34)). In addition, the screen includes icons 825 enabling a user to print the contents of the current screen and download the entire portfolio as a compressed archive (e.g., zip file).

Figure 33:
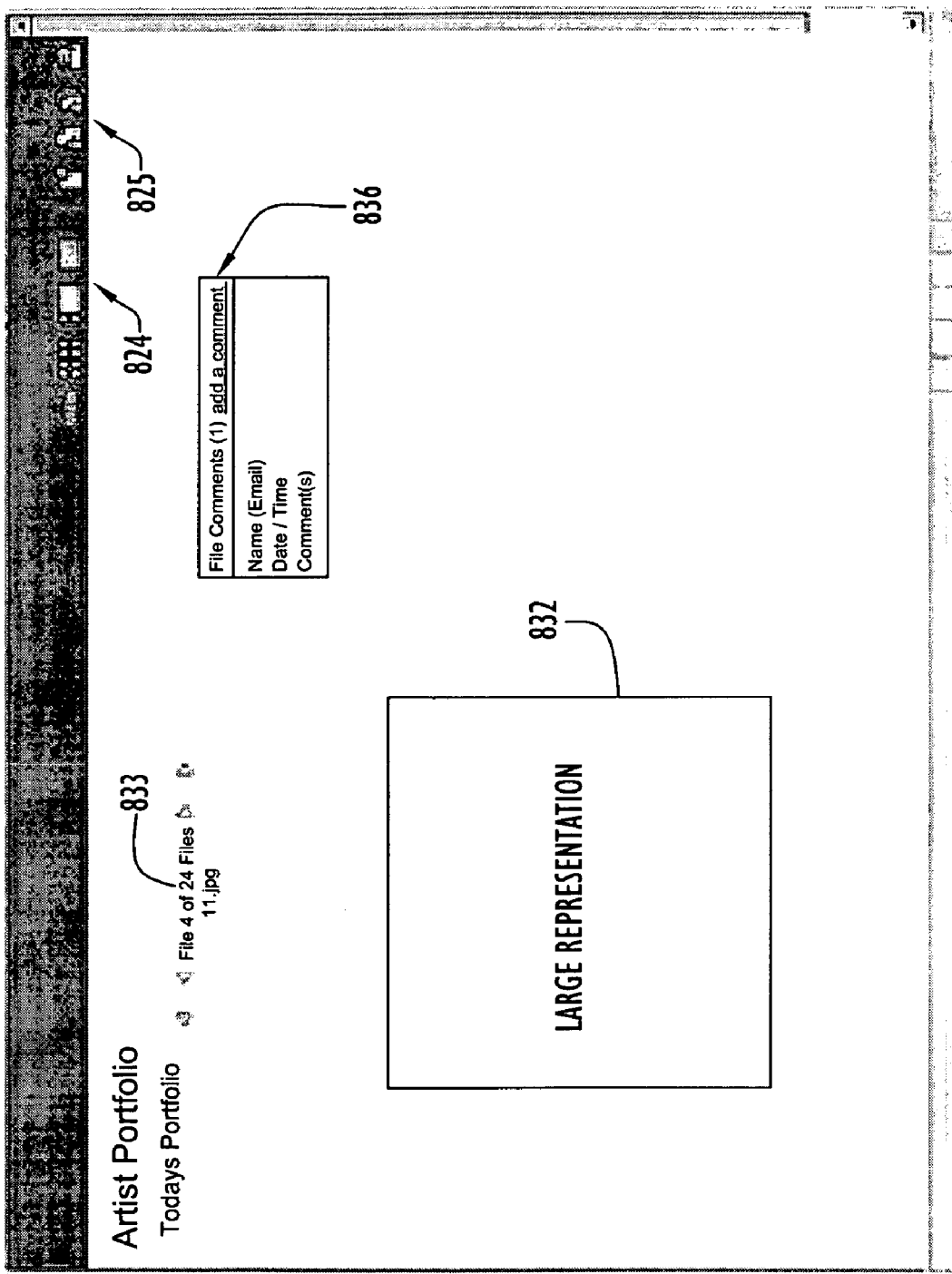
FIG. 33 is a schematic illustration of an exemplary graphical user screen previewing a creative asset of a portfolio.

An exemplary graphical user screen employed by portfolio slideshow module 111 to provide a large view is illustrated in FIG. 33. The screen displays a large representation 832 of a creative asset of the portfolio. The screen includes icons 824 enabling the user to toggle between the current and other interfaces (e.g., a thumbnail view interface (FIG. 32) or a large view with thumbnail scroller interface (FIG. 34)) and icons 825 enabling a user to print the contents of the current screen, download the entire portfolio as a compressed archive (e.g., .zip file) and open/download the currently selected creative asset. The screen further includes icons 833 enabling the user to navigate to preceding and succeeding creative assets within the portfolio. In addition, the screen includes icons 836 that enable the user to post one or more comments specific to the current displayed asset.

Figure 34:
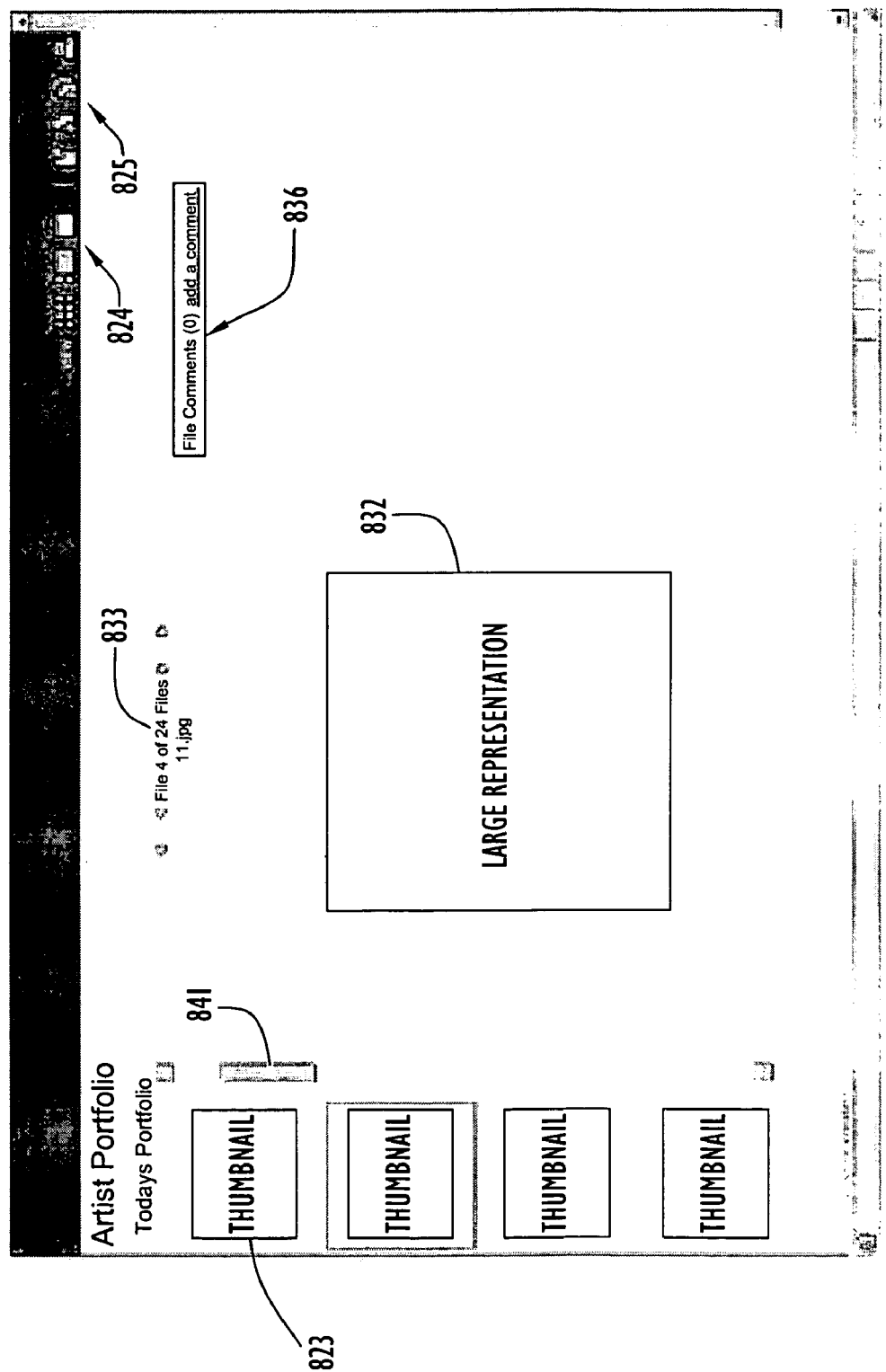
FIG. 34 is a schematic illustration of an exemplary graphical user screen previewing the various creative assets of a portfolio in the form of scrollable thumbnail images.

An exemplary graphical user screen employed by portfolio slideshow module 111 to provide a large view with a thumbnail scroller is illustrated in FIG. 34. The screen includes the creative assets of the portfolio in the form of scrollable thumbnail images 823 and a large representation 832 of a selected creative asset within the portfolio. A thumbnail scroller 841 may be utilized to scroll through thumbnail images 823. When a thumbnail image is selected (e.g., via a mouse click), the screen is refreshed to reflect the newly selected creative asset and display that asset in the form of large representation 832. The screen includes icons 824 enabling the user to toggle between the current and other interfaces (e.g., a thumbnail view interface (FIG. 32) or a large view interface (FIG. 33)) and icons 825 enabling a user to print the contents of the current screen, download the entire portfolio as a compressed archive (e.g., zip file) and open/download the currently selected creative asset. The screen further includes icons 833 enabling the user to navigate to preceding and succeeding creative assets within the portfolio. In addition, the screen includes icons 836 that enable the user to post one or more comments specific to the current displayed asset.

The virtual asset management system of the present invention may further enable users to upload creative assets from the end user system directly into a selected portfolio. A single interface is utilized combining the essential capabilities of the virtual file system manager with the virtual portfolio system. The virtual file system manager is hidden from the user, where the virtual portfolio manager is extended to enable the user to upload creative assets from the end user system directly into the virtual portfolio system as described below.

Figure 29:
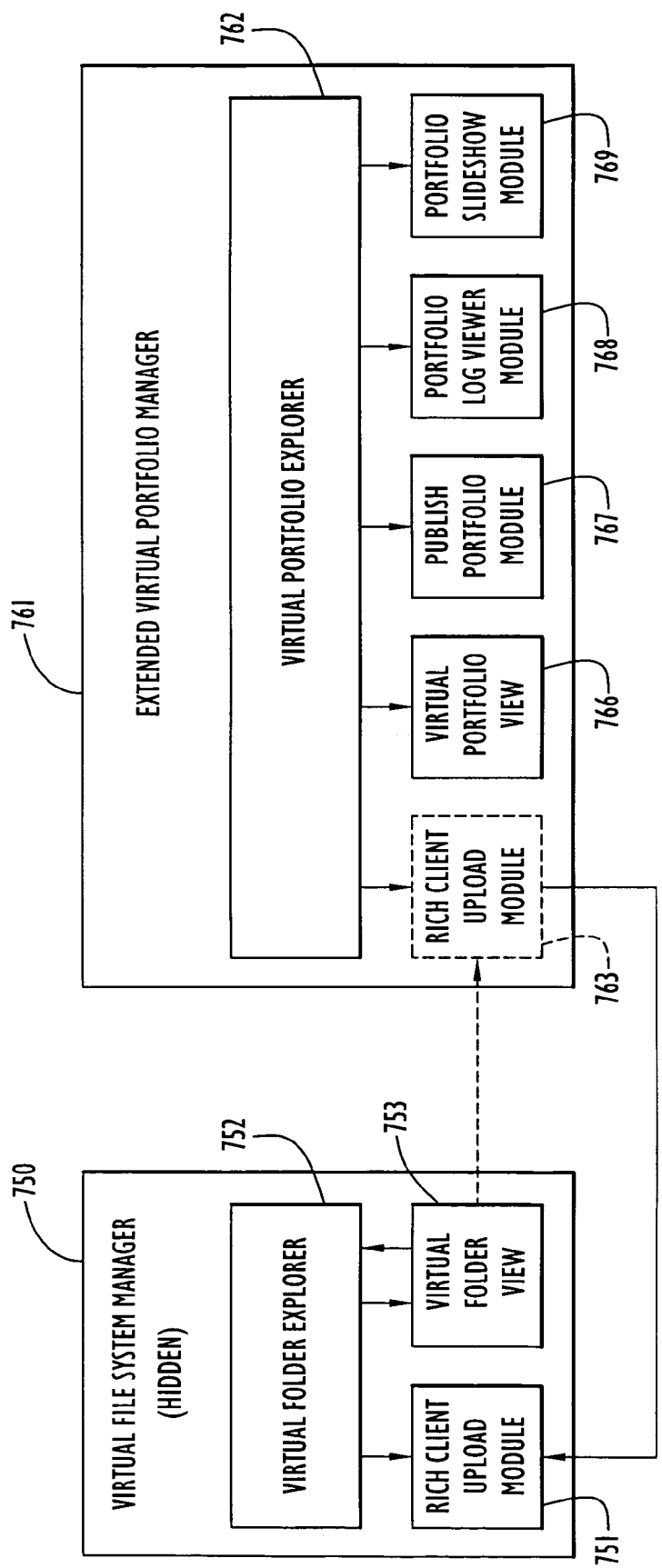
FIG. 29 is a block diagram of the software architecture for extended portfolio management according to the present invention.

The interface modules for this functionality are illustrated in FIG. 29. In particular, system 90 includes a hidden virtual file system manager module 750 and an extended virtual portfolio manager module 761. Hidden virtual file system manager 750 includes a virtual folder explorer module 752, a Rich Client upload module 751 and a virtual folder view module 753, each substantially similar to the corresponding modules described above in FIG. 5.

Extended virtual portfolio manager 761 extends the functionality of virtual portfolio manager 106 (FIG. 5) and includes a virtual portfolio explorer module 762, a virtual portfolio view module 766, a publish portfolio module 767, a portfolio log viewer module 768 and a portfolio slideshow module 769, each substantially similar to the corresponding modules described above for FIG. 5. The extended virtual portfolio manager hides the virtual file system from the user and enables creative assets to be uploaded from the end user system directly into the virtual portfolio system. Extended portfolio manager 761 further includes a Rich Client upload module 763 described below. Manager modules 750 and 761 typically reside within domain/business layer 36 (FIG. 2) and interact with data access layer 35, Web server 37 and virtual file repository 38 to perform the functions described below.

Extended virtual portfolio manager 761 is similar to virtual portfolio manager module 106, but enables a user to upload creative assets from the end user system directly into the virtual portfolio system via Rich Client upload module 763. In response to initiation of an upload request by a user via Rich Client upload module 763, the selected assets are initially uploaded into an arbitrary virtual folder in virtual file system 38 (FIG. 2) via Rich Client upload module 751 in substantially the same manner described above. This operation is transparent to the user. Hidden virtual file system manager 750 subsequently publishes recently uploaded files from the arbitrary virtual folder to the virtual portfolio system via virtual folder view module 753 and Rich Client upload module 763. This operation is similarly transparent to the user. Thus, the operation appears to the user to directly upload files from the end user system to the selected portfolio.

Figure 30:
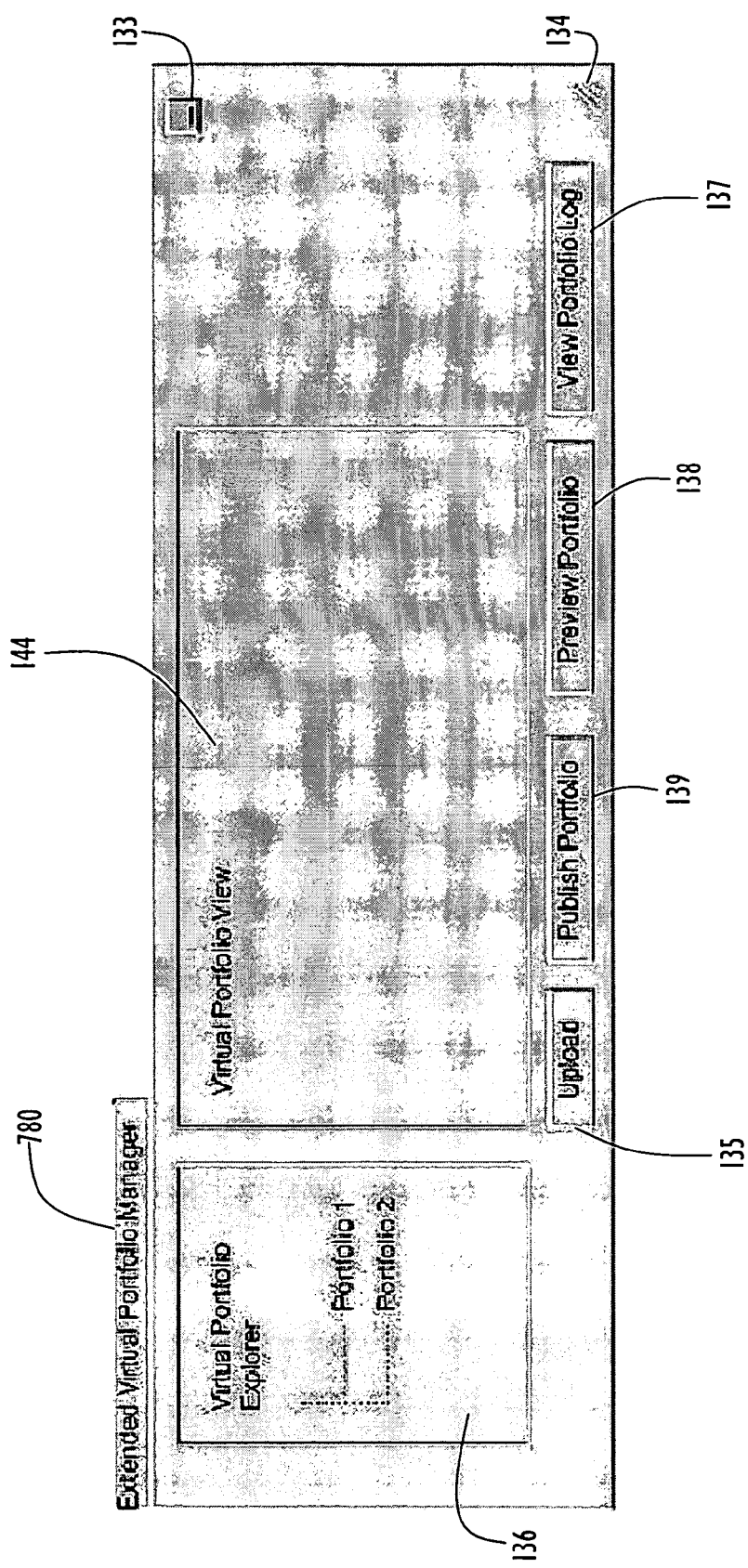
FIG. 30 is a schematic illustration of an exemplary graphical user screen employed for extended portfolio management.

An exemplary graphical user screen employed by extended virtual portfolio manger 761 is illustrated in FIG. 30. Extended portfolio manager interface 780 is similar to the portfolio manager interface described above for FIG. 7 and includes portfolio selection area 136, portfolio view area 144, view portfolio log button 137, preview portfolio button 138 and publish portfolio button 139, each as described above. Interface 780 further includes icons or symbols 133, 134 to enable users to respectively minimize and resize the interface as described above. The portfolio selection area includes a directory listing of portfolios within the virtual file system, while the portfolio view area provides thumbnail images of the creative assets within a portfolio selected by a user in the portfolio selection area. Preview portfolio button 138 enables the selected portfolio to be viewed via portfolio slideshow module 111 in substantially the same manner described above (e.g., FIGS. 31-34), while view portfolio log button 137 enables viewing of a history log as described above. Actuation of publish portfolio button 139 enables a selected creative asset and/or portfolio to be published as described above.

Interface 780 further includes upload button 135. Actuation of this button enables a user to upload creative assets from the end user system into a hidden virtual file system folder via hidden virtual file system manager 750 as described above. The uploaded assets are subsequently published into the selected portfolio transparent to the user as described above.

It will be appreciated that the embodiments described above and illustrated in the drawings represent only a few of the many ways of implementing a system and method for managing creative assets via a Rich user client interface.

The remote computing devices employed by the present invention may be implemented by any quantity of any personal or other type of computer system (e.g., IBM-compatible, Apple, Macintosh, laptop, palm pilot, etc.). The remote computing devices may include any commercially available operating system (e.g., Windows, OS/2, Unix, Linux, etc.) and any commercially available or custom software (e.g., browser software, etc.). The remote computing devices may include any types of monitors and input devices (e.g., keyboard, mouse, voice recognition, etc.) to view and navigate the screens, enter information and/or actuate buttons or icons.

The central application and database servers may be implemented by any quantity of any personal or other type of computer system (e.g., IBM-compatible, server systems, etc.). The servers may include any commercially available operating system (e.g., Windows, Unix, Linux, etc.) and any commercially available or custom software (e.g., communications software, server software, etc.). The servers may include any types of monitors and input devices (e.g., keyboard, mouse, voice recognition, etc.).

The database may be implemented by any quantity of any type of conventional or other databases (e.g., relational, hierarchical, etc.) or storage structures (e.g., files, data structures, etc.). The database may store any desired information (e.g., pertaining to files, folders, portfolios, users, etc.) arranged in any fashion (e.g., tables, relations, etc.).

It is to be understood that the software for the computer systems of the present invention (e.g., remote computing devices, central application server, database server, etc.) may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention may be distributed in any manner among the remote computing devices, central application server and database servers. The software and/or algorithms described above and illustrated in the flow charts may be modified in any manner that accomplishes the functions described herein. In addition, a user may perform the functions in the flow charts or description in any order that accomplishes a desired operation.

The software of the present invention system may be available on a recorded medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The communication network may be implemented by any quantity of any type of communications network (e.g., LAN, WAN, Internet, Intranet, VPN, etc.). The computer systems of the present invention (e.g., remote computing devices, central application server, database server, etc.) may include any conventional or other communications devices to communicate over the networks via any conventional or other protocols. The computer systems (e.g., remote computing devices, central application server, database server, etc.) may utilize any type of connection (e.g., wired, wireless, etc.) for access to the network.

The interfaces of the present invention (e.g., display screens, windows, etc.) may be arranged in any fashion and contain any type of information (e.g., portfolios, folders, files, characteristics of the creative assets, etc.). The interfaces may include any quantity of any type of buttons, icons, menus and/or symbols of any shapes or sizes disposed at any locations to display information and/or initiate any desired actions (e.g., context menus, publish, view, etc.). The interfaces may include any quantity of any type of fields (e.g., fill in, drop down menus or lists, etc.), areas or sub windows of any shapes or sizes disposed at any locations to receive any information from the system and/or user and/or to display information. The interfaces may include any quantity of tabs or other dividers to partition the areas in any desired fashion based on any characteristics. The tabs or dividers may include any suitable labels. The system may display and/or receive information via any input mechanisms (e.g., screens, menus, line prompts, forms, fields, etc.). The interfaces may display creative assets in any size, shape or resolution. The creative assets may include any objects capable of being stored digitally (e.g., text, audio, video, photograph, image, software application, source code, object code, executable, etc.) within any type of file (e.g., .jpg, .swf., .gif, .pdf, .ppt, .doc, .wpd, .txt, .tif, .exe, etc.).

The context menu and any associated operations may be invoked via any suitable operation (e.g., icon, right and/or left mouse click, voice command, keyboard, etc.). The menu may include any suitable operations (e.g., cut, paste, properties, move, etc.). Plural files may be selected in any fashion (e.g., highlight plural files and utilize a mouse click or keyboard, mouse drag operation, keyboard operations, etc.).

The interfaces may display folders and/or portfolios in any suitable structure (e.g., tree, directory listing, list of files in any order (e.g., alphabetical, size, etc.), thumbnails, etc.). The interfaces may display any suitable attributes (e.g., portfolio, file, folder, etc.) in any suitable structure (e.g., fields, tables, etc.). The tables may include any quantity of columns and/or rows and may contain any desired attributes or other information. The tables may include any suitable row and/or column headers and may be sorted based on any suitable characteristics (e.g., name, size, date, etc.).

The system may arrange, organize and/or store the creative assets in any fashion (e.g., folders, directories, portfolios, nested folders or sub-folders, nested portfolios or sub-portfolios, etc.). The folders may be of any quantity and include any quantity of files and/or sub-folders, while the portfolios may be of any quantity and include any quantity of files and/or sub-portfolios. The system may employ separate interfaces or an integrated interface to manage folders and/or portfolios.

The file stepper and thumbnail scroller may be utilized to navigate to any desired file within a portfolio or folder and may be utilized with any system interface or screen. The files may be ordered in any desired fashion and associated with any suitable identifier (e.g., numeric or alphanumeric identifier, symbol, etc.) for navigation. The zoom slider may adjust the thumbnail images to any desired size or magnification (e.g., zoom in/zoom out two times, four times, etc.) and may be utilized with any system interface or screen to adjust the size of displayed creative assets (e.g., thumbnails, large view, etc.). The dimensions of the screens and or individual screen areas may be adjusted by a user in any desired fashion (e.g., horizontal viewing area, vertical viewing area, minimized or hidden, etc.).

The present invention employs a Rich Client interface to basically emulate desktop functionality (e.g., cut, copy, paste, drag and drop, context menus, etc.) across a network with a remote host. By way of example only, the present invention employs Flash applications to implement the Rich Client interfaces. However, any suitable applications providing this functionality may be employed. In addition, the present invention may provide any desktop or other functions to manage virtual assets across the network to provide a user friendly interface (e.g., move, cut/paste, delete operations with remote file systems, drag and drop operations across remote file systems, context menus, etc.). The present invention may further employ any type of intermediary module to enable a Rich application to access a local file system (e.g., an intermediate storage unit to store information, an application, etc.).

The extended portfolio manager may directly upload files from an end user system into a portfolio in any suitable manner (e.g., upload to the virtual file system and transfer to the portfolio system, provide copies to both the virtual file and portfolio systems concurrently, etc.). Alternatively, the portfolio file system may be implemented as a separate system independent of the virtual file system and may reside on another processing system.

The system may upload files in any suitable manner (e.g., via local file system operations (e.g., cut/paste, move, etc.), drag and drop operations, menus, electronic mail, etc.). These operations may be performed in any desired fashion to accomplish an upload. For example, when an upload by electronic mail operation is requested, a blank electronic mail message may be displayed on an end user system, via a default electronic mail client application, with a predefined dropbox electronic mail address specified in the destination field and the end user electronic mail address in the originating field. The user attaches the files to be uploaded to the electronic mail message using any standards-based electronic mail client and actuates a message send button to send the message. A polling service installed on a network with access permissions continually polls a mail server that stores all electronic mail messages for the predefined dropbox electronic mail address. When an electronic mail message with corresponding attachments is identified, the attachments are uploaded into the central application server using conventional file transport techniques. The files received via electronic mail subsequently appear in a pre-designated (e.g., My Email Dropbox) folder in the virtual file system.

It is to be understood that the terms "top", "bottom", "side", "upper", "lower", "front", "rear", "horizontal", "vertical", "right", "left" and the like are used herein merely to describe points of reference and do not limit the present invention to any specific configuration or orientation.

The present invention may be utilized for any type of data storage and/or management application. The system may be a stand-alone or networked system, or may be combined or embedded within other systems.

From the foregoing description, it will be appreciated that the invention makes available a novel system and method for managing creative assets via a Rich user client interface, wherein integrated virtual asset management and publishing capabilities are provided via a Rich user client interface.

Having described preferred embodiments of a new and improved system and method for managing creative assets via a Rich user client interface, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A management system for managing virtual assets stored remotely from an end user comprising:
   a storage system to store virtual assets in the form of files;
   a management processing system coupled to said storage system to manage said stored virtual assets, wherein said management processing system includes:
      a file manager module to manage said stored virtual assets ranged within a hierarchy including a plurality of tiers in the form of folders with each folder including at least one virtual asset file; and
      a portfolio manager module to manage said stored virtual assets arranged within portfolios with each portfolio including at least one virtual asset file selected by a user, wherein said file and portfolio manager modules selectively enable files to be uploaded from an end user system directly into a portfolio, and wherein said file manager module includes a hidden upload module to transfer, in a manner transparent to said user, selected files from at least one end user system to said management processing system for storage in an arbitrary folder, and said portfolio manager module includes a portfolio upload module to receive said selected files from said arbitrary folder and place those files within a selected portfolio; and
   at least one end user system each remote from and in communication with said management processing system via a network and including a user interface module including a Rich Client user interface to enable a user to interact with said file and portfolio manager modules to manage said stored virtual assets, wherein said user interface module facilitates application of file system operations performed locally by said user on a corresponding end user system to said remotely stored virtual assets to manage those assets, and wherein said local file system operations include at least one of a drag and drop operation and selection of a local file system operation from a popup menu.

2. The management system of claim 1, wherein said network includes the Internet.

3. The management system of claim 1, wherein said file manager module includes:

an explorer module to display and enable manipulation of said stored virtual assets within said hierarchy;
an upload module to transfer virtual assets from said at least one end user system to said management processing system for storage in said storage system; and
a view module to display stored virtual assets within a folder selected by said user.

4. The management system of claim 3, wherein said view module includes:
   a thumbnail module to display said virtual assets within said selected folder in the form of thumbnail images, wherein dimensions of said displayed thumbnail images are adjustable by said user;
   a list module to display said virtual assets within said selected folder in the form of a list of files; and
   an enlarge view module to display a selected virtual asset of said selected folder in the form of an enlarged image with corresponding asset attributes and to enable user selection of another creative asset within said selected folder.

5. The management system of claim 3, wherein said upload module includes:
   a local file module transferable to at least one end user system to retrieve information from a local file system of a corresponding end user system relating to local files selected by a user for transference from that end user system to said management processing system;
   an upload interface module transferable to said at least one end user system to maintain a list of said selected local files and initiate transference of those files to said management processing system;
   an intermediate module transferable to said at least one end user system and in communication with said local file and upload interface modules to notify said upload interface module that local files have been selected by said user; and
   a file module to process said selected files transferred from said end user system to said management processing system for storage in said storage system.

6. The management system of claim 3, wherein said upload module includes:
   a mail module to transmit an electronic mail message including at least one virtual asset to upload said at least one virtual asset to said management processing system.

7. The management system of claim 1, wherein said portfolio manager module includes:
   an explorer module to display and enable manipulation of said virtual assets within said portfolios;
   a view module to display stored virtual assets within a portfolio selected by said user;
   a publish module to send a selected portfolio to another user;
   a log module to maintain and display a log of portfolio activity; and
   a preview module to preview a portfolio.

8. The management system of claim 7, wherein said view module includes:
   a thumbnail module to display said virtual assets within said selected portfolio in the form of thumbnail images, wherein dimensions of said displayed thumbnail images are adjustable by said user;
   a list module to display said virtual assets within said selected portfolio in the form of a list of files; and
   an enlarge view module to display a selected virtual asset of said selected portfolio in the form of an enlarged image with corresponding asset attributes and to enable user selection of another creative asset within said selected portfolio.

9. The management system of claim 7, wherein said publish module includes:
a mail module to transmit an electronic mail message to a recipient of said selected portfolio including access information enabling said recipient to access said selected portfolio, wherein said access information includes a network address to access said selected portfolio.

10. The management system of claim 9, wherein said access information further includes a password in response to said selected portfolio including password protection.

11. The management system of claim 7, wherein said preview module includes:
a thumbnail module to display said virtual assets within said selected portfolio in the form of thumbnail images;
an enlarge view module to display a selected virtual asset of said selected portfolio in the form of an enlarged image;
a thumbnail view module to display a selected virtual asset of said selected portfolio in the form of an enlarged image and remaining virtual assets within said selected portfolio in the form of scrollable thumbnail images;
a comment module to facilitate insertion of user comments for a selected virtual asset within said selected portfolio; and
a download module to facilitate transference of at least one of a selected virtual asset and said selected portfolio to at least one end user system.

12. The management system of claim 1, wherein said management processing system further includes:
a transfer interface module to transfer user selected virtual asset files between folders managed by said file manager module and portfolios managed by said portfolio manager module.

13. A method of managing virtual assets stored remotely from an end user via a management processing system and at least one end user system each remote from and in communication with said management processing system via a network, said method comprising:
(a) storing virtual assets in the form of files in a storage system;
(b) managing, via said management processing system, said stored virtual assets arranged within a hierarchy including a plurality of tiers in the form of folders with each folder including at least one virtual asset file;
(c) managing, via said management processing system, said stored virtual assets arranged within portfolios with each portfolio including at least one virtual asset file selected by a user;
(d) selectively uploading files from an end user system directly into a portfolio by transferring selected files from at least one end user system to said management processing system for storage in an arbitrary folder within said hierarchy in a manner transparent to said user and receiving said selected files from said arbitrary folder and placing those files within a selected portfolio; and
(e) applying file system operations performed locally by a user on an end user system to said remotely stored virtual assets via a Rich Client user interface to enable a user to remotely manage said virtual assets, wherein said local file system operations include at least one of a drag and drop operation and selection of a local file system operation from a popup menu.

14. The method of claim 13, wherein said network includes the Internet.

15. The method of claim 13, wherein step (b) further includes:
(b.1) displaying and enabling manipulation of said stored virtual assets within said hierarchy in response to a corresponding user action;
(b.2) transferring virtual assets from said at least one end user system to said management processing system for storage in said storage system in response to a corresponding user action; and
(b.3) displaying stored virtual assets within a folder selected by said user in response to a corresponding user action.

16. The method of claim 15, wherein step (b.2) includes:
(b.2.1) retrieving information from a local file system of a corresponding end user system relating to local files selected by a user for transference from that end user system to said management processing system;
(b.2.2) detecting said selection of local files by said user and providing notification of said selection;
(b.2.3) maintaining a list of said selected local files in response to said notification and initiating transference of those files to said management processing system in response to a corresponding user action; and
(b.2.4) processing said selected files transferred from said end user system to said management processing system for storage in said storage system.

17. The method of claim 15, wherein step (b.2) further includes:
(b2.1) transmitting an electronic mail message including at least one virtual asset to upload said at least one virtual asset to said management processing system.

18. The method of claim 15, wherein step (b.1) further includes:
(b.1.1) displaying said virtual assets within said selected folder in the form of thumbnail images in response to a corresponding user action, wherein dimensions of said displayed thumbnail images are adjustable by said user;
(b.1.2) displaying said virtual assets within said selected folder in the form of a list of files in response to a corresponding user action; and
(b.1.3) displaying a selected virtual asset of said selected folder in the form of an enlarged image with corresponding asset attributes and enabling user selection of another creative asset within said selected folder in response to corresponding user actions.

19. The method of claim 13, wherein step (c) includes:
(c.1) displaying and enabling manipulation of said virtual assets within said portfolios in response to a corresponding user action;
(c.2) displaying stored virtual assets within a portfolio selected by said user in response to a corresponding user action;
(c.3) sending a selected portfolio to another user in response to a corresponding user action;
(c.4) maintaining a log of portfolio activity and displaying said log in response to a corresponding user action; and
(c.5) previewing a portfolio in response to a corresponding user action.

20. The method of claim 19, wherein step (c.1) includes:
(c.1.1) displaying said virtual assets within said selected portfolio in the form of thumbnail images in response to a corresponding user action, wherein dimensions of said displayed thumbnail images are adjustable by said user;

(c.1.2) displaying said virtual assets within said selected portfolio in the form of a list of files in response to a corresponding user action; and (c.1.3) displaying a selected virtual asset of said selected portfolio in the form of an enlarged image with corresponding asset attributes and enabling user selection of another creative asset within said selected portfolio in response to corresponding user actions.

21. The method of claim 19, wherein step (c.3) includes:

(c.3.1) transmitting an electronic mail message to a recipient of said selected portfolio including access information enabling said recipient to access said selected portfolio, wherein said access information includes a network address to access said selected portfolio.

22. The method of claim 21, wherein said access information further includes a password in response to said selected portfolio including password protection.

23. The method of claim 19, wherein step (c.5) includes:

(c.5.1) displaying said virtual assets within said selected portfolio in the form of thumbnail images in response to a corresponding user action;

(c.5.2) displaying a selected virtual asset of said selected portfolio in the form of an enlarged image in response to a corresponding user action;

(c.5.3) displaying a selected virtual asset of said selected portfolio in the form of an enlarged image and remaining virtual assets within said selected portfolio in the form of scrollable thumbnail images in response to a corresponding user action;

(c.5.4) facilitating insertion of user comments for a selected virtual asset within said selected portfolio in response to a corresponding user action; and (c.5.5) facilitating transference of at least one of a selected virtual asset and said selected portfolio to at least one end user system in response to a corresponding user action.

24. The method of claim 13, wherein step (e) includes:

(e.1) transferring user selected virtual asset files between said folders and said portfolios.

25. A management system for managing virtual assets stored remotely from an end user within a storage system in the form of files, wherein at least one end user system enables a user to mange said stored virtual assets over a network, said management system comprising:

a management processing system coupled to said storage system and remote from and in communication with said at least one end user system via said network to manage said stored virtual assets, wherein said management processing system includes:

a file manager module to manage said stored virtual assets arranged within a hierarchy including a plurality of tiers in the form of folders with each folder including at least one virtual asset file;

a portfolio manager module to manage said stored virtual assets arranged within portfolios with each portfolio including at least one virtual asset file selected by a user, wherein said file and portfolio manager modules selectively enable files to be uploaded from an end user system directly into a portfolio, and wherein said file manager module includes a hidden upload module to transfer, in a manner transparent to said user, selected files from at least one end user system to said management processing system for storage in an arbitrary folder, and said portfolio manager module includes a portfolio upload module to receive said selected files from said arbitrary folder and place those files within a selected portfolio; and an interface module to interact with a Rich Client user interface of an end user system and apply file system operations performed locally by said user on that end user system to said stored virtual assets to manage those assets, wherein said local file system operations include at least one of a drag and drop operation and selection of a local file system operation from a popup menu.

26. The management system of claim 25, wherein said network includes the Internet.

27. The management system of claim 25, wherein said file manager module includes:

an upload module to transfer virtual assets from said at least one end user system to said management processing system for storage in said storage system, wherein said upload module includes:

a local file module transferable to at least one end user system to retrieve information from a local file system of a corresponding end user system relating to local files selected by a user for transference from that end user system to said management processing system;

an upload interface module transferable to said at least one end user system to maintain a list of said selected local files and initiate transference of those files to said management processing system;

an intermediate module transferable to said at least one end user system and in communication with said local file and upload interface modules to notify said upload interface module that local files have been selected by said user, and a file module to process said selected files transferred from said end user system to said management processing system for storage in said storage system.

28. The management system of claim 25, wherein said portfolio manager module includes:

a publish module to send a selected portfolio to another user, wherein said portfolio module includes:

a mail module to transmit an electronic mail message to a recipient of said selected portfolio including access information enabling said recipient to access said selected portfolio, wherein said access information includes a network address to access said selected portfolio, and wherein said access information further includes a password in response to said selected portfolio including password protection.

* * * * *